United States Patent
Yoneshima et al.

(10) Patent No.: US 8,829,829 B2
(45) Date of Patent: Sep. 9, 2014

(54) APPARATUS FOR CALCULATING ROTATIONAL POSITION OF ROTARY MACHINE

(75) Inventors: Hiroko Yoneshima, Kariya (JP); Yasuaki Aoki, Kariya (JP); Hideji Yoshida, Hashima (JP)

(73) Assignee: Denso Corporation, Kariya (JP)

( * ) Notice: Subject to any disclaimer, the term of this patent is extended or adjusted under 35 U.S.C. 154(b) by 194 days.

(21) Appl. No.: 13/372,638

(22) Filed: Feb. 14, 2012

(65) Prior Publication Data

US 2012/0206077 A1    Aug. 16, 2012

(30) Foreign Application Priority Data

Feb. 14, 2011    (JP) .................................. 2011-028352

(51) Int. Cl.
*H02P 21/00*    (2006.01)
*H02P 6/18*    (2006.01)
*H02P 21/14*    (2006.01)
*H02P 27/08*    (2006.01)
*H02M 1/38*    (2007.01)

(52) U.S. Cl.
CPC .............. *H02P 6/185* (2013.01); *H02P 21/146* (2013.01); *H02M 2001/385* (2013.01); *H02P 2203/11* (2013.01); *H02P 27/08* (2013.01); *H02P 2203/03* (2013.01)
USPC ...... 318/400.02; 318/805; 318/807; 318/809; 318/400.01; 318/700

(58) Field of Classification Search
USPC .............................. 318/807, 809, 400.02, 805
See application file for complete search history.

(56) References Cited

U.S. PATENT DOCUMENTS

| | | | | |
|---|---|---|---|---|
| 5,559,419 A | * | 9/1996 | Jansen et al. ................... | 318/808 |
| 5,585,709 A | * | 12/1996 | Jansen et al. ................... | 318/807 |
| 7,180,263 B2 | * | 2/2007 | Maeda et al. .................. | 318/719 |
| 7,482,777 B2 | * | 1/2009 | Tomigashi ..................... | 318/807 |
| 7,759,897 B2 | * | 7/2010 | Piippo ............................ | 318/700 |

(Continued)

FOREIGN PATENT DOCUMENTS

| | | |
|---|---|---|
| JP | 3312472 | 5/2002 |
| JP | 3454212 | 7/2003 |

(Continued)

OTHER PUBLICATIONS

Office Action (6 pgs.) dated Jan. 29, 2013 issued in corresponding Japanese Application No. 2011-028352 with an at least partial English-language translation thereof (6 pgs.).

*Primary Examiner* — Eduardo Colon Santana
*Assistant Examiner* — Bickey Dhakal
(74) *Attorney, Agent, or Firm* — Nixon & Vanderhye PC

(57) ABSTRACT

In a system, a superimposing element sets a command value vector of a high-frequency voltage signal and superimposes the high-frequency voltage signal with the command value vector on an output voltage of an inverter. The high-frequency voltage signal has a frequency higher than an electrical angular frequency of a rotary machine. The command value vector is correlated with a measured high-frequency component value of a current signal flowing in the rotary machine. A calculating element calculates a rotational angle of the rotary machine based on the measured high-frequency component value of the current signal flowing in the rotary machine. A reducing element controls at least one of the inverter and a direct voltage power supply to reduce a difference due to the dead time between the command value vector and a vector of a high-frequency voltage signal to be actually superimposed on the output voltage of the inverter.

17 Claims, 20 Drawing Sheets

(56) References Cited

U.S. PATENT DOCUMENTS

| | | |
|---|---|---|
| 2001/0002784 A1 | 6/2001 | Masaki et al. |
| 2008/0111516 A1 | 5/2008 | Inokuma |

FOREIGN PATENT DOCUMENTS

| | | |
|---|---|---|
| JP | 2007-124835 | 5/2007 |
| JP | 2007-124836 | 5/2007 |
| JP | 2007-202278 | 8/2007 |
| JP | 2008-125207 | 5/2008 |
| JP | 2008-125260 | 5/2008 |
| JP | 2008-199842 | 8/2008 |
| JP | 2008-220089 | 9/2008 |
| JP | 2009-095145 | 4/2009 |
| JP | 2009-254112 | 10/2009 |

* cited by examiner

FIG.11
(a)
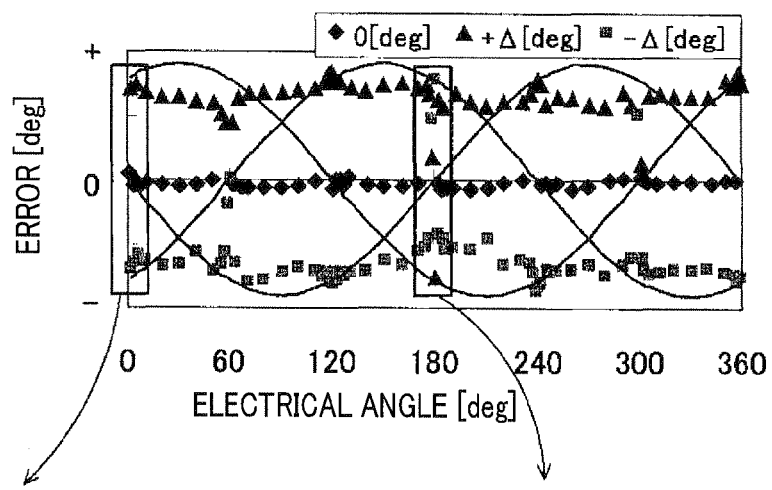
(b) i* = 0    (c) i* = 0
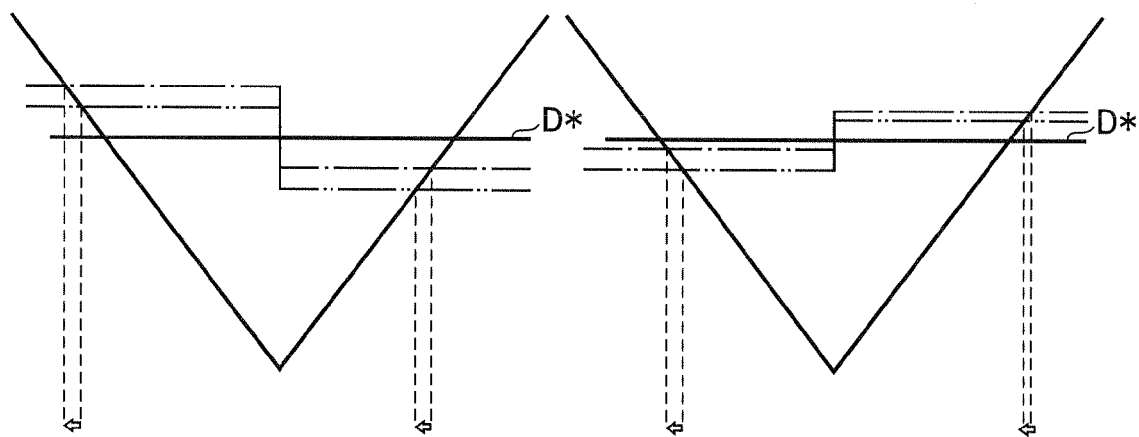

FIG.19

| TERMINAL VOLTAGE DURING DEAD TIME | | | dq PHASE ERROR VOLTAGES | |
|---|---|---|---|---|
| U | V | W | vde | vqe |
| VDC→0 | – | – | $-\sqrt{(2/3)}VDC \cdot \alpha \cdot \cos\theta$ | $\sqrt{(2/3)}VDC \cdot \alpha \cdot \sin\theta$ |
| 0→VDC | – | – | $\sqrt{(2/3)}VDC \cdot \alpha \cdot \cos\theta$ | $-\sqrt{(2/3)}VDC \cdot \alpha \cdot \sin\theta$ |
| – | VDC→0 | – | $-\sqrt{(2/3)}VDC \cdot \alpha \cdot \cos(\theta-120)$ | $\sqrt{(2/3)}VDC \cdot \alpha \cdot \sin(\theta-120)$ |
| – | 0→VDC | – | $\sqrt{(2/3)}VDC \cdot \alpha \cdot \cos(\theta-120)$ | $-\sqrt{(2/3)}VDC \cdot \alpha \cdot \sin(\theta-120)$ |
| – | – | VDC→0 | $-\sqrt{(2/3)}VDC \cdot \alpha \cdot \cos(\theta-240)$ | $\sqrt{(2/3)}VDC \cdot \alpha \cdot \sin(\theta-240)$ |
| – | – | 0→VDC | $\sqrt{(2/3)}VDC \cdot \alpha \cdot \cos(\theta-240)$ | $-\sqrt{(2/3)}VDC \cdot \alpha \cdot \sin(\theta-240)$ |

$$\alpha = \frac{DT}{Tc}$$

APPARATUS FOR CALCULATING ROTATIONAL POSITION OF ROTARY MACHINE

CROSS REFERENCE TO RELATED APPLICATIONS

This application is based on and claims the benefit of priority from Japanese Patent Application 2011-028352 filed on Feb. 14, 2011, the disclosure of which is incorporated in its entirety herein by reference.

TECHNICAL FIELD

The present disclosure relates to apparatuses for calculating the rotational position of a rotary machine.

BACKGROUND

An example of various types of control systems for a three-phase motor is disclosed in Japanese Patent Publication No. 3312472.

A control system disclosed in the Patent Publication superimposes, on an output signal from an inverter, a high-frequency voltage signal oscillating in the positive and negative directions in an estimated d-axis of a salient three-phase motor, and estimates the rotation angle of the motor based on a high-frequency current signal actually created in the motor.

The salient structure (salient characteristic) of the three-phase motor means a characteristic in which a magnetic resistance created in the d-axis of the three-phase motor is higher than that created in a q-axis thereof. In other words, the salient structure (salient characteristic) of the three-phase motor means a characteristic in which inductance in the d-axis of the three-phase motor is lower than that in the q-axis thereof.

SUMMARY

The frequency of the high-frequency voltage signal to be superimposed on the output signal of the inverter is normally set to be within an audible frequency range. For this reason, this high-frequency voltage superimposing method may cause noise to occur audibly recognizable by humans in estimating the rotational angle of the three-phase motor. In order to reduce such noise, it is effective in reducing in magnitude in the high-frequency voltage signal. However, the inventors of the present disclosure has found out that the reduction in magnitude in the high-frequency voltage signal may reduce the accuracy of estimating the rotational angle of the three-phase motor.

In view of the circumstances set forth above, one aspect of the present disclosure seeks to provide apparatuses for calculating the rotational position of a rotary machine, which are capable of addressing such a problem set forth above.

Specifically, an alternative aspect of the present disclosure aims to provide such apparatuses capable of calculating the rotational position of a rotary machine with noise caused by the calculation process being kept low.

According to a first exemplary aspect of the present disclosure, there is provided a system for driving an inverter equipped with a first switching element, a first diode connected in antiparallel to the first switching element, a second switching element, and a second diode connected in antiparallel to the second switching element, so that the inverter connects a terminal of a salient-pole rotary machine selectively to one of a positive terminal and a negative terminal of a direct voltage power supply via the respective first and second switching elements to thereby control a controlled variable of the rotary machine. The first and second switching elements are turned on or off with a dead time during which both the first and second switching elements are off. The system includes a superimposing element configured to set a command value vector of a high-frequency voltage signal and superimpose the high-frequency voltage signal with the command value vector on an output voltage of the inverter. The high-frequency voltage signal has a frequency higher than an electrical angular frequency of the rotary machine. The command value vector is correlated with a measured high-frequency component value of a current signal flowing in the rotary machine. The system includes a calculating element configured to calculate a rotational angle of the rotary machine based on the measured high-frequency component value of the current signal flowing in the rotary machine. The system includes a reducing element configured to control at least one of the inverter and the direct voltage power supply to reduce a difference due to the dead time between the command value vector and a vector of an actually superimposed high-frequency voltage signal on the output voltage of the inverter.

In the first exemplary aspect of the present disclosure, the difference due to the dead time between the command value vector and the vector of the high-frequency voltage signal to be actually superimposed on the output voltage of the inverter may adversely affect on the accuracy of calculating the rotational position of the rotary machine.

Thus, the reducing element reduces the difference, thus reducing the adverse affect of the difference on the accuracy of calculating the rotational position of the rotary machine.

An error voltage vector is due to the difference between the vector of the high-frequency voltage signal to be actually superimposed and the command value vector. In other words, if a voltage is applied to the terminal of the rotary machine during the dead time via the inverter, the voltage depends on the polarity of a current flowing through the terminal of the rotary machine. The voltage applied during the dead time serves as the error voltage for the command value vector. The percentage of the error voltage in the command value vector increases with increase in the magnitude (norm) of the command value vector. Thus, the difference between the high-frequency voltage signal to be actually superimposed and the command value vector increases with reduction in the magnitude of the command value vector.

In order to address such a situation, in an embodiment of the first exemplary aspect of the present disclosure, a parallel setting element is configured to set the command value vector such that the direction of the error voltage vector set forth above and the direction of the command value vector are parallel to each other. This configuration allows an angle formed by the error voltage vector and the command value vector to be set to zero, thus preventing reduction in the accuracy of calculating the rotational position of the rotary machine.

Note that the direction of the command voltage vector is defined as a direction that the system intends to set by the command voltage vector. In other words, the direction of the command voltage vector is defined as a direction determined based on the command voltage vector if a value of the rotational angle of the system is correct.

According to a second exemplary aspect of the present disclosure, there is provided a system for driving an inverter equipped with a first switching element, a first diode connected in antiparallel to the first switching element, a second switching element, and a second diode connected in antiparallel to the second switching element, so that the inverter connects a terminal of a salient rotary machine selectively to one of a positive terminal and a negative terminal of a direct voltage power supply via the respective first and second switching elements to thereby control a controlled variable of the rotary machine. The first and second switching elements are turned on or off with a dead time during which both the first and second switching elements are off. The system includes a superimposing element configured to superimpose a high-frequency voltage signal on an output voltage of the inverter, the high-frequency voltage signal having a frequency higher than an electrical angular frequency of the rotary machine. The system includes a calculating element configured to calculate a rotational angle of the rotary machine based on a measured high-frequency component of a current signal flowing in the rotary machine. The superimposing element includes a command value setter configured to set a command value vector of the high-frequency voltage signal. The superimposing element includes a correction voltage calculator configured to calculate, based on an error voltage vector, a correction voltage vector that reduces an affect of the error voltage vector on an actually superimposed high-frequency voltage signal on the output voltage of the inverter. The error voltage vector is due to a difference between a vector of the actually superimposed high-frequency voltage signal and the command value vector. The superimposing element includes a controller configured to correct the command value vector based on the correction voltage vector, and control the inverter based on a result of the correction.

In the second exemplary aspect of the present disclosure, the error voltage due to the difference between the vector of the high-frequency voltage to be actually superimposed and the command voltage vector may adversely affect on the accuracy of calculating the rotational position of the rotary machine.

In other words, the error voltage vector is due to the difference between the vector of the high-frequency voltage signal to be actually superimposed and the command value vector. That is, if a voltage is applied to the terminal of the rotary machine during the dead time via the inverter, the voltage depends on the polarity of a current flowing through the terminal of the rotary machine. The voltage applied during the dead time serves as the error voltage for the command value vector. The percentage of the error voltage in the command value vector increases with increase in the magnitude (norm) of the command value vector. Thus, the difference between the high-frequency voltage signal to be actually superimposed and the command value vector increases with reduction in the magnitude of the command value vector.

Thus, the correction voltage calculator calculates, based on the error voltage vector, the correction voltage vector that reduces the affect of the error voltage vector on the high-frequency voltage signal to be actually superimposed on the output voltage of the inverter. The controller corrects the command value vector based on the correction voltage vector to reduce the affect of the error voltage vector on the high-frequency voltage signal to be actually superimposed, thus reducing the adverse affect of the error voltage on the accuracy of calculating the rotational position of the rotary machine.

According to a third exemplary aspect of the present disclosure, there is provided a system for driving an inverter equipped with a first switching element, a first diode connected in antiparallel to the first switching element, a second switching element, and a second diode connected in antiparallel to the second switching element, so that the inverter connects a terminal of a salient rotary machine selectively to one of a positive terminal and a negative terminal of a direct voltage power supply via the respective first and second switching elements to thereby control a controlled variable of the rotary machine. The first and second switching elements are turned on or off with a dead time during which both the first and second switching elements are off. The system includes a superimposing element configured to superimpose a high-frequency voltage signal on an output voltage of the inverter, the high-frequency voltage signal having a frequency higher than an electrical angular frequency of the rotary machine. The system includes a calculating element configured to calculate a rotational angle of the rotary machine based on a measured high-frequency value of a current signal flowing in the rotary machine. The superimposing element includes a command value setter configured to set a command value vector of the high-frequency voltage signal, and a direction determining element configured to determine a reverse timing of a polarity of the command value vector to reduce a high-frequency voltage signal to be actually superimposed on the output voltage of the inverter from being deviated from the command value vector.

In the third exemplary aspect of the present disclosure, the direction determining element determines the reverse timing of the polarity of the command value vector to reduce the actually superimposed high-frequency voltage signal on the output voltage of the inverter from being deviated from the command value vector. This makes it possible to reduce the adverse affect of the deviation of the actually superimposed high-frequency voltage signal from the command value vector.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which:

FIG. 11 is a timing chart schematically illustrating the cause of problems illustrated therein;

FIG. 19 is a view schematically illustrating an example of methods of calculating correction voltages according to the sixth embodiment;

DETAILED DESCRIPTION OF EMBODIMENT

Figure 1:
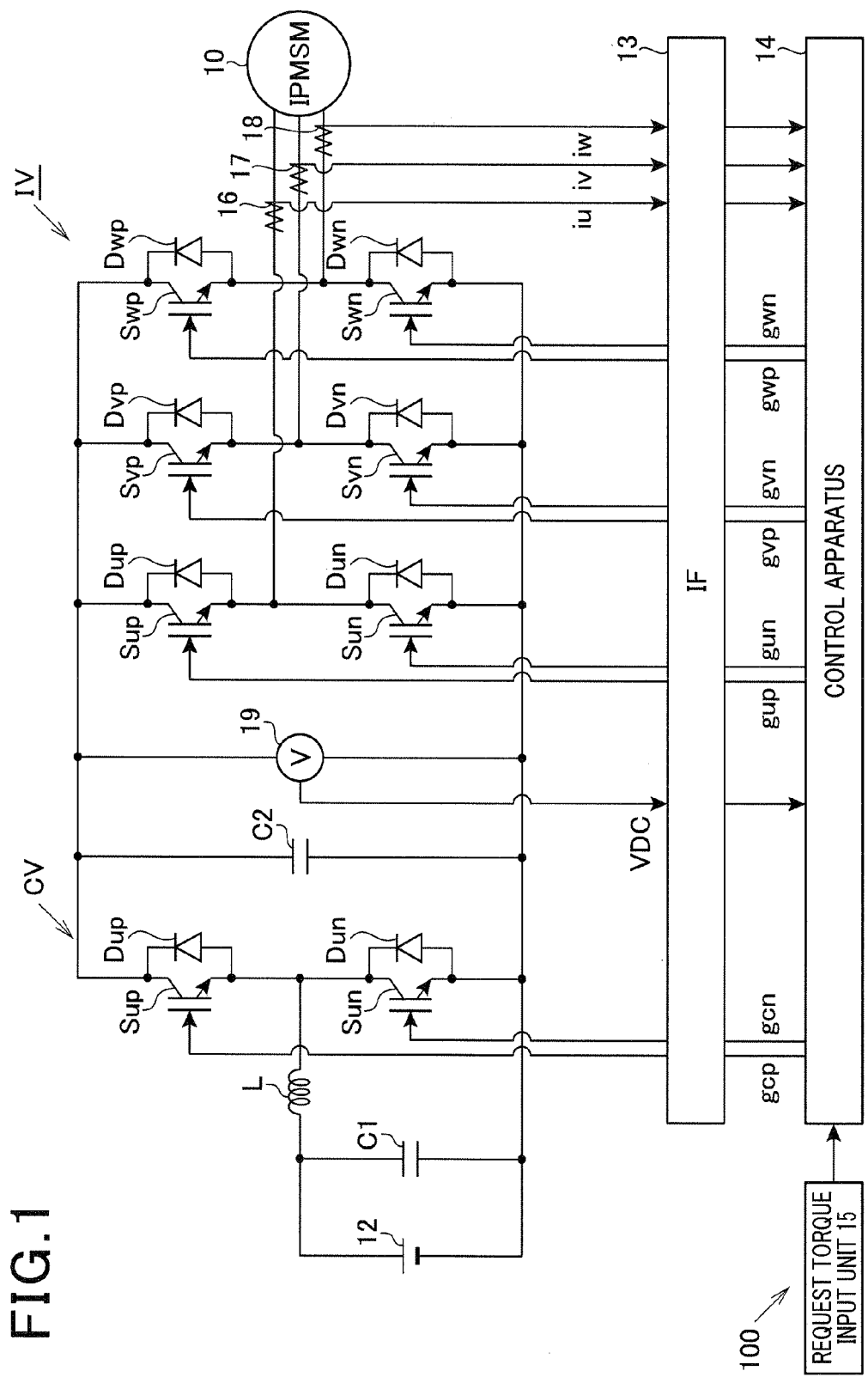
FIG. 1 is a circuit diagram of a control system according to the first embodiment of the present disclosure.

Embodiments of the present disclosure will be described hereinafter with reference to the accompanying drawings. In the embodiments, like parts between the embodiments, to which like reference characters are assigned, are omitted or simplified to avoid redundant description.

First Embodiment

Referring to FIG. 1, there is illustrated a three-phase motor-generator as an example of rotary machines, referred to simply as a "motor-generator" 10, installed in, for example, a motor vehicle as a main engine according to the first embodiment. As the motor-generator 10, a motor having a salient-pole structure is used. For example, as the motor-generator 10, an IPMSM (Interior Permanent Magnet Synchronous Motor) is used.

In FIG. 1, there is also illustrated a control system 100. The control system 100 is equipped with an inverter IV serving as a circuit for applying a variable output voltage to the motor-generator 10, a voltage converter CV, a high-voltage battery 12, an interface 13, and a control apparatus 14. The voltage converter CV and the high-voltage battery 12 serve as, for example, a direct voltage power supply.

Specifically, the motor-generator 10 and the high-voltage battery 12 can establish electrical connection therebetween via the inverter IV and the voltage converter CV.

For example, the motor-generator 10 is provided with an annular rotor having an iron rotor core. The iron rotor core is, for example, directly or indirectly coupled to a crankshaft of an engine installed in the motor vehicle.

The rotor has a salient-pole structure.

Specifically, the rotor core of the rotor is provided at its circumferential portions with at least one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being π/2 radian electric angle leading with respect to a corresponding d-axis during rotation of the rotor. In other words, the q-axis is electromagnetically orthogonal to the d-axis.

The d and q axes constitute a d-q coordinate system (rotating coordinate system) defined in the rotor of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings (armature windings) wound in the slots of the stator.

The three-phase windings are wound in the slots such that the U-, V-, and W-phase windings are shifted by an electric angle of, for example, π/3 radian in phase from each other.

For example, the three-phase armature windings (U-, V-, and W-phase windings) each have one end connected to a common junction (neutral point) and the other end to a separate terminal in, for example, a star-configuration.

The motor-generator 10 is operative to receive at its three-phase windings three-phase currents to generate a rotating magnetic flux; this allows the rotor to turn based on magnetic attractive force between the rotating magnetic flux and a magnetic flux of the rotor.

The voltage converter CV includes a coil L, a capacitor C1, a capacitor C2, a pair of series-connected switching elements CV1 and CV2, and a pair of flywheel diodes Dp and Dn.

One electrode of the capacitor C1 is connected to a positive terminal of the high-voltage battery 12, and the other thereof to a negative terminal of the high-voltage battery 12. One end of the coil L is connected to both the positive terminal of the high-voltage battery 12 and the one electrode of the capacitor C1.

In the first embodiment, as the switching elements CV1 and CV2, IGBTs (Insulated Gate Bipolar Transistors) are respectively used. The flywheel diodes Dp and Dn are connected in antiparallel to the switching elements CV1 and CV2, respectively. The other end of the coil L is connected to a point at which the switching elements CV1 and CV2 are electrically connected in series.

When power MOSFETs are used as the pair of switching elements CV1 and CV2, intrinsic diodes of the power MOSFETs can be used as the flywheel diodes, thus eliminating the flywheel diodes.

The capacitor C2 is connected in parallel to the pair of high- and low-side switching elements CV1 and CV2.

For example, when the control system 100 operates in a power-running control mode, the switching elements CV1 and CV2 of the voltage converter CV are driven on and off. This converts a voltage across the battery 12 into a higher voltage using electromagnetic energy stored in the coil L by the on and off switchings of the switching elements CV1 and CV2.

In addition, when the control system 100 operates in a regenerative control mode while the hybrid vehicle is decelerated, the motor-generator 10 serves as a generator to thereby convert mechanical power based on the rotation of the motor-generator 10 into electrical power. The electrical power is converted by the inverter IV into DC power. The switching elements CV1 and CV2 of the voltage converter CV are driven on and off. This converts a voltage across the capacitor C2 based on the converted DC power into a lower voltage based on voltage drop across the coil L by the on and off switchings of the switching elements CV1 and CV2. The lower voltage stepped down from the voltage across the capacitor C2 is charged in the battery 12.

The inverter IV serves as, for example, a circuit configured to output an AC (Alternating Current) voltage to be applied to the motor-generator 10. Specifically the inverter IV is designed as a three-phase inverter. The inverter IV is provided with a first pair of series-connected high- and low-side (upper- and lower-arm) switching elements Sup and Sun, a second pair of series-connected high- and low-side (upper- and lower-arm) switching elements Svp and Svn, and a third pair of series-connected high- and low-side (upper- and lower-arm) switching elements Swp and Swn. The inverter IV is also provided with flywheel diodes Dup, Dun, Dvp, Dvn, Dwp, and Dwn electrically connected in antiparallel to the switching elements Sup, Sun, Svp, Svn, Swp, and Swn, respectively.

In the first embodiment, as the switching elements Sup, Sun, Svp, Svn, Swp, and Swn, IGBTs are respectively used.

When power MOSFETs are used as the switching elements Sup, Sun, Svp, Svn, Swp, and Swn, intrinsic diodes of the power MOSFETs can be used as the flywheel diodes, thus eliminating the flywheel diodes.

The first to third pairs of switching elements are parallely connected to each other in bridge configuration.

A connecting point through which the switching elements Sup and Sun of the first pair are connected to each other in series is connected to an output lead extending from the separate terminal of the U-phase winding. Similarly, a connecting point through which the switching elements Svp and Svn of the second pair are connected to each other in series is connected to an output lead extending from the separate end of the V-phase winding. Moreover, a connecting point through which the switching elements Swp and Swn of the third pair are connected to each other in series is connected to an output lead extending from the separate end of the W-phase winding.

One end of the series-connected switching elements of each of the first, second, and third pairs, such as the drain of the corresponding high-side switching element, is connected to the positive terminal of the battery 12 via a positive terminal of the inverter IV, the switching element CV1 and the coil L. The other end of the series-connected switching elements of each of the first, second, and third pairs, such as the source of the corresponding low-side switching element, is connected to the negative terminal of the battery 12 via a negative terminal of the inverter IV.

The control system 100 is equipped with, as means for detecting operating conditions of each of the motor-generator 10 and the inverter IV, current sensors 16, 17, and 18, and a voltage sensor 19.

The current sensor 16 is arranged to allow measurement of an instantaneous U-phase alternating current iu actually flowing through the U-phase winding of the stator. Similarly, the current sensor 17 is arranged to allow measurement of an instantaneous V-phase alternating current iv actually flowing through the V-phase winding of the stator. The current sensor 18 is arranged to allow measurement of an instantaneous W-phase alternating current iw actually flowing through the W-phase winding of the stator.

The current sensors 16, 17, and 18 are communicable with the control apparatus 14 through the interface 13.

Specifically, each of the current sensors 16, 17, and 18 is operative to send, to the control apparatus 14, the instantaneous value of a corresponding one of the U-, V-, and W-phase alternating currents as some of the motor-generator state variables.

The voltage sensor 19 is arranged to allow measurement of an input voltage (power supply voltage) VDC to be applied to the inverter IV. The voltage sensor 19 is communicable with the control apparatus 14 through the interface 13, and operative to send, to the control apparatus 14, the inverter input voltage VDC to be applied to the inverter IV as one of the motor-generator state variables.

The measured values of the sensors 16 to 19 are captured, via the interface 13, to the control apparatus 14. The control apparatus 14 is connected with a request torque input unit 15 for inputting, to the control apparatus 14, a request torque Tr for the motor-generator 10.

Specifically, the control apparatus 14 is designed to generate and output drive signals for driving the converter CV and the inverter IV based on the measured values of the sensors 16 to 19 to thereby adjust an actual torque of the motor-generator 10 to be matched with the request torque Tr.

Drive signals gcp and gcn to be outputted from the control apparatus 14 are for driving the switching elements CV1 and CV2, respectively. Drive signals gup and gun to be outputted from the control apparatus 14 are for driving the switching elements Sup and Sun, respectively. Drive signals gvp and gvn to be outputted from the control apparatus 14 are for driving the switching elements Svp and Svn, respectively. Drive signals gwp and gwn to be outputted from the control apparatus 14 are for driving the switching elements Swp and Swn, respectively. Each of the drive signals gcp, gcn, gup, gun, gyp, gvn, gwp, and gwn is, for example, a pulse signal with a controllable pulse width (a controllable on duration).

The control apparatus 14 is designed as, for example, a computer circuit consisting essentially of, for example, a CPU and a nonvolatile memory, and operates on a voltage lower than the battery voltage. Thus, the control apparatus 14 constitutes a low voltage system, and the motor-generator 10, the inverter IV, the converter CV, and the high-voltage battery 12 constitute a high voltage system.

Figure 2:
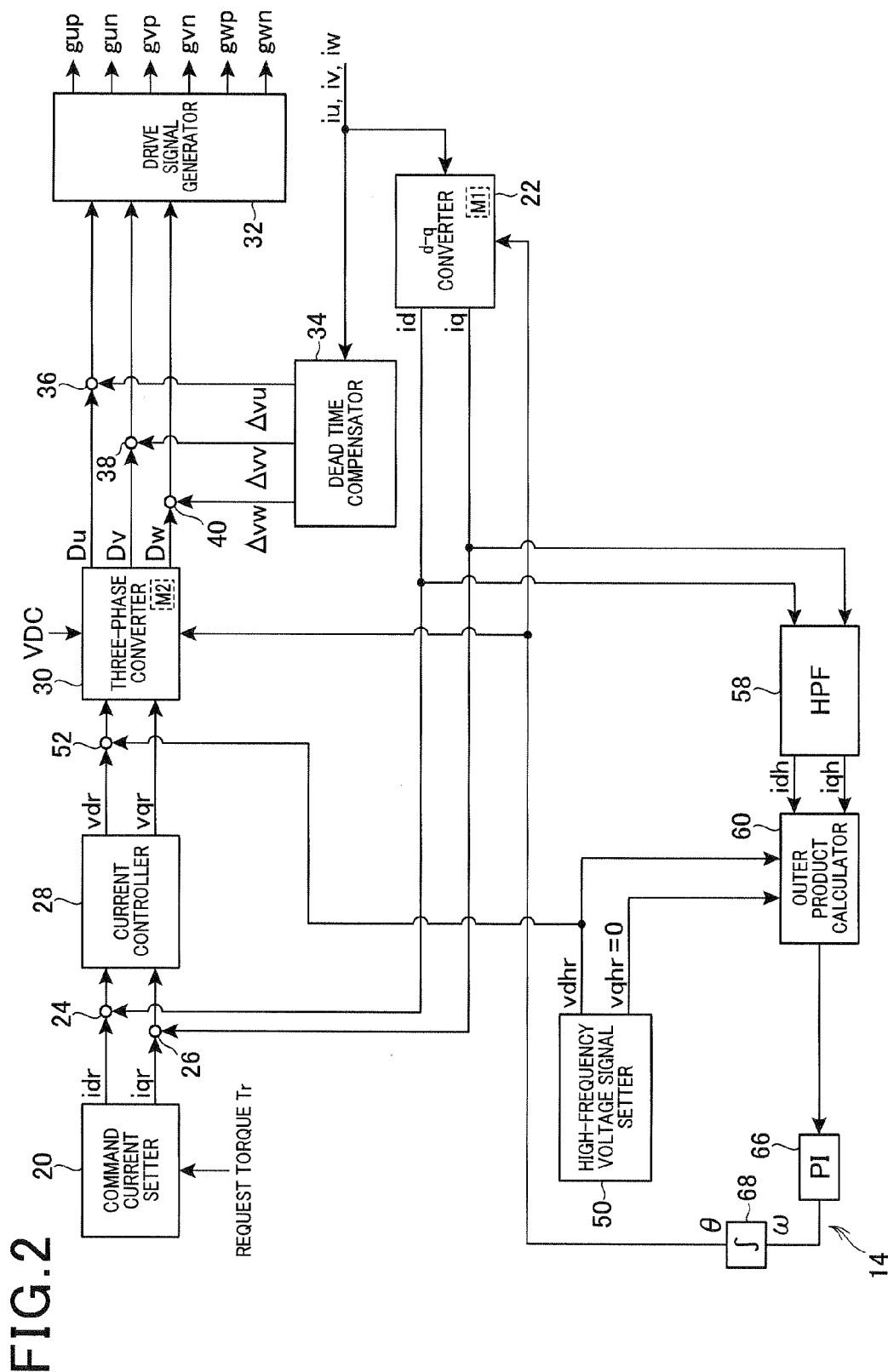
FIG. 2 is a block diagram schematically illustrating functional modules of a control apparatus equivalent to tasks to be executed thereby according to the first embodiment.

FIG. 2 schematically illustrates functional modules of the control apparatus 14 equivalent to tasks to be executed by the control apparatus 14.

As illustrated in FIG. 2, the control apparatus 14 includes a command current setter 20, a d-q converter 22, deviation calculators 24 and 26, a current controller 28, a three-phase converter 30, a drive signal generator 32, dead time compensator 34, and correctors 36, 38, and 40. The control apparatus 14 also includes a high-frequency signal setter 50, a superimposing unit 52, a high-pass filter 58, an outer product calculator 60, a velocity calculator 66, and an angle calculator 68.

First, some of the modules of the control apparatus for a controlled-variable controlling task will be described hereinafter.

The command current setter 20 is operative to receive the request torque Tr inputted from the request torque input unit 15. The command current setter 20 is also operative to set a command d-axis current component idr and a command q-axis current component iqr in the d-q coordinate system of the rotor based on the request torque Tr.

The d-q converter 22 has, for example, a map M1 in data-table format, in mathematical expression format, and/or program format.

Specifically, the d-q converter 22 is operative to receive actual instantaneous U-, V-, and W-phase alternating currents iu, iv, and iw measured by the respective current sensors 16, 17, and 18 and a rotational angle θ of the motor-generator 10 (the d-axis of the rotor) calculated by a rotational angle calculating task described later relative to, for example, the direction of the U-phase of the stator. The d-q converter 22 is also operative to convert the received actual instantaneous U-, V-, and W-phase alternating currents iu, iv, and iw in the stator coordinate system into actual d-axis and q-axis current components id and iq in the d-q coordinate system of the rotor based on the calculated rotational angle θ of the motor-generator 10 and the map M1.

The deviation calculator 24 is operative to calculate a deviation Δid between the command d-axis current component idr and the actual d-axis current component id. The deviation calculator 26 is operative to calculate a deviation Δiq between the command q-axis current component iqr and the actual q-axis current component iq.

The current controller 28 is operative to calculate, based on the deviation Δid, a command voltage vdr in the d-axis; this command voltage vdr means a feedback manipulated value for d-axis current to allow the command d-axis current component idc to be matched with the measured actual d-axis current component id.

The current controller 28 is also operative to calculate, based on the deviation Δiq, a command voltage vqr in the q-axis; this command voltage vqr means a feedback manipulated value for q-axis current to allow the command q-axis current component iqr to be matched with the measured actual q-axis current component iq.

Specifically, in the first embodiment, the current controller 28 computes each of the command voltages vdr and vqr using a proportional gain term and an integral gain term of a proportional integral feedback algorithm.

In the proportional integral feedback algorithm, each of the command voltages vdr and vqr is expressed based on the proportional gain term and integral gain term.

The proportional gain term for each of the command voltages vdr and vqr contributes to change in a corresponding one of the command voltages vdr and vqr in proportion to a corresponding one of the temporal deviations Δid and Δiq. The integral gain term is proportional to an accumulated offset of instantaneous values of each of the temporal deviations Δid and Δiq over time to reset the accumulated offset (steady-state deviation) over time to zero.

The three-phase converter 30 has, for example, a map M2 in data-table format, in mathematical expression format, and/or program format.

Specifically, the three-phase converter 30 is operative to convert, based on the calculated rotational angle θ and the map M2, the command voltages vdr and vqr in the d and q axes into a U-phase command voltage vur, a V-phase command voltage vvr, and a W-phase command voltage vwr for the respective U-, V-, and W-phase windings of the motor-generator 10. The U-, V-, and W-phase command voltages vur, vvr, and vwr correspond to, for example, substantially pseudo sinusoidal waves, respectively. Note that the command voltage vdr outputted from the current controller 28 is corrected by superimposing a d-axis high-frequency component vdhr described later on the command voltages vdr by the superimposing unit 52, and the corrected command voltages vdr is inputted to the three-phase converter 30 as the command voltage vdr. In this embodiment, the high-frequency voltage signal setter 50 and the superimposing unit 52 serve as a superimposing element.

The three-phase converter 30 is also operative to divide, by the half (½) level of the inverter input voltage VDC, the command voltages vur, vvr, and vwr to thereby generate normalized U-, V-, and W-phase duty signals Du, Dv, and Dw, respectively.

The dead time compensator 34 is operative to calculate dead-time correction values Δ vu, vv, and vw for feedforward control of the respective duty signals Du, Dv, and Dw based on the corresponding phase currents iu, iv, and iw. The operations of the dead time compensator 34 will be fully described later.

Each of the correctors 36, 38, and 40 is operative to correct a corresponding one of the duty signals Du, Dv, and Dw based on a corresponding one of the dead-time correction values Δvu, vv, and vw.

The drive signal generator 32 is operative to perform a PWM task based on comparison in magnitude between the corrected duty signals Du, Dv, and Dw and a cyclic triangular carrier CS, thus generating drive signals gup, gun, gyp, gvn, gwp, and gwn. Each of the drive signals gup, gun, gyp, gvn, gwp, and gwn is a pulse signal with a controllable duty cycle (controllable pulse width). As the carrier CS, a cyclic sawtooth carrier signal can be used.

Figure 3:
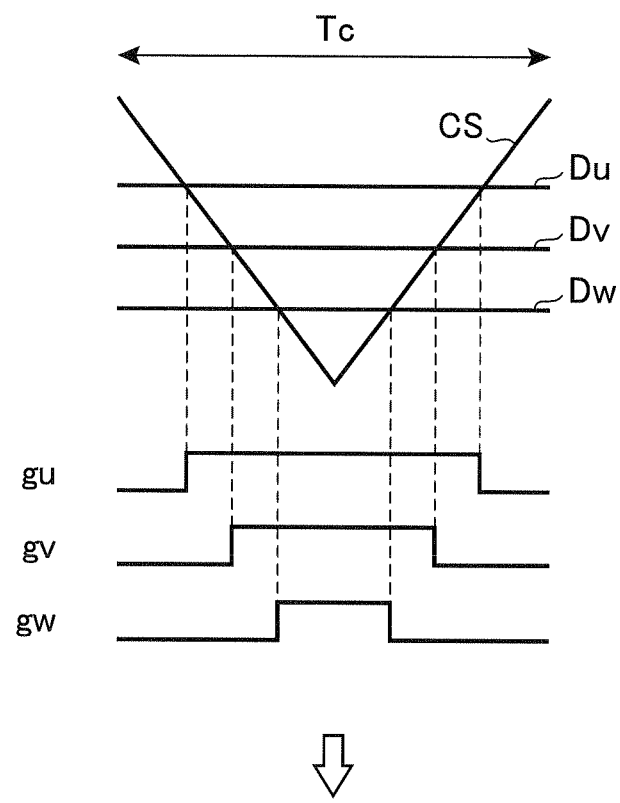
FIG. 3 is a timing chart schematically illustrating a PWM task to be carried out by a drive signal generator illustrated in FIG. 1.

FIG. 3 schematically illustrates in detail the PWM task to be carried out by the drive signal generator 32. Specifically, in FIG. 3, 1 cycle of the triangular carrier CS is illustrated in enlarged form, and the duty signals Du, Dv, and Dw are superimposed on the triangular carrier CS. As described above, the triangular carrier CS is used, which has an amplitude of 1 and a substantially isosceles triangle with the rate and duration of rise being identical to the rate and duration of fall, respectively.

The PWM task is configured to compare in magnitude the triangular carrier CS with the corrected duty signals Du, Dv, and Dw, and to generate the PWM signals (pulses) gu, gv, and gw. That is, each of the PWM signals gu, gv, and gw has an on duty (duty cycle) whose duration is in agreement with the period of a corresponding duty signal lower in magnitude than the triangular carrier CS (see FIG. 3).

The PWM task is also configured to generate, based on the PWM pulses gu, gv, and gw, high-side (upper-arm) drive signals g*p (*=u, v, w) and low-side (lower-arm) drive signals g*n (*=u, v, w). For generation of the high-side drive signals g*p and the low-side drive signals g*n, the PWM task is configured to introduce a time delay (dead time) DT between each of the high-side drive signals g*p and a corresponding one of the low-side drive signals g*n to prevent a short circuit in the DC link.

Specifically, the PWM task is configured to delay the rising edge of each of the high- and low-side drive signals g*# (*=u, v, w, #=p, n) by the dead time DT relative to a corresponding one of the PWM signals gu, gv, and gw (see FIG. 3). As illustrated in FIG. 3, each of the duty signals Du, Dv, and Dw is kept unchanged within 1 cycle of the triangular carrier CS, and therefore, the update cycle Tc of each of the duty signals Du, Dv, and Dw (the command voltages vur, vvr, and vwr) is set to be identical to the cycle of the triangle carrier CS. More specifically, in this embodiment, each of the duty signals Du, Dv, and Dw is set to be updated each time the triangle carrier CS reaches its upper peak.

Figures 4A, 4B:
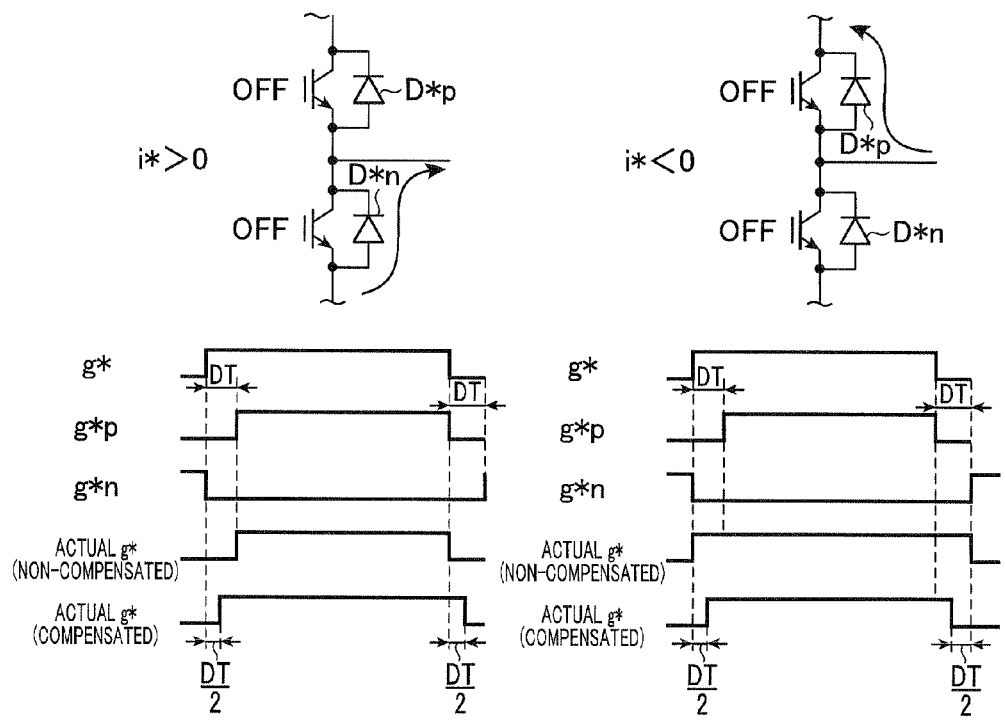
FIG. 4A is a timing chart schematically illustrating a dead time compensating task if a phase current is positive according to the first embodiment.
FIG. 4B is a timing chart schematically illustrating a dead time compensating task if a phase current is negative according to the first embodiment.
Figure 4C:
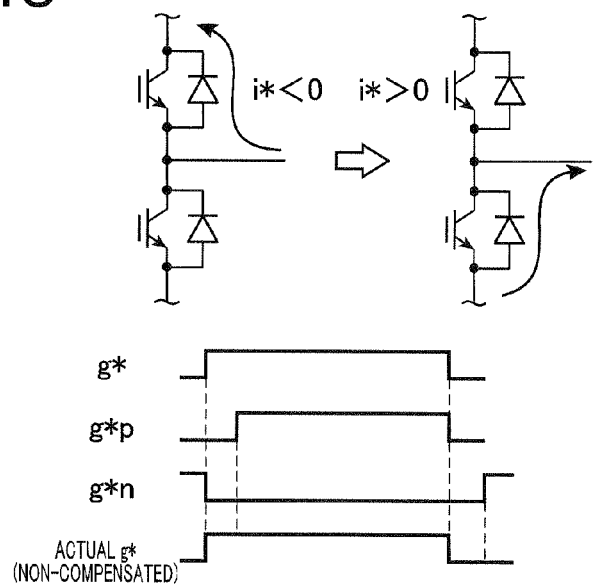
FIG. 4C is a timing chart schematically illustrating a dead time compensating task if a phase current is reversed in polarity from negative to positive according to the first embodiment.

FIGS. 4A to 4C schematically illustrate in detail the operations of the dead time compensator 34.

In FIGS. 4A to 4C, a pair of upper- and lower-arm switching elements with a pair of upper- and lower-arm diodes for one phase winding is illustrated as an example.

When a phase current i* (*=u, v, or w) is positive during a dead time DT (see FIG. 4A), a current flows through a corresponding lower-arm diode D*n to continuously cause the positive phase current i* to flow during the dead time DT. For this reason, the on duration of a drive signal g*p for a corresponding upper-arm switching element is shorter than the on duration of the corresponding PWM signal g* by the dead time DT. In addition, the rising edge of the corresponding drive signal g*p is delayed by the dead time DT relative to the rising edge of the corresponding PWM signal g*.

In this case, the dead time compensator 34 corrects the corresponding duty signal D* by adding the dead-time correction value Δv* thereto, thus delaying each of the rising edge and falling edge of the corresponding PWM signal g* by the half of the dead time DT (DT/2). This results in agreement between the on duration of the drive signal g*p and that of the corresponding PWM signal g* before correction. This also results in reduction in half of the delay of the riding edge of the drive signal g*p.

Next, when a phase current i* (*=u, v, or w) is negative during a dead time DT (see FIG. 4B), a current flows through a corresponding upper-arm diode D*p to continuously cause the negative phase current i* to flow during the dead time DT. For this reason, the on duration of a drive signal g*p for a corresponding upper-arm switching element is longer than the on duration of the corresponding PWM signal g* by the dead time DT.

In this case, the dead time compensator 34 corrects the corresponding duty signal D* by subtracting the dead-time correction value Δ v* therefrom, thus correcting each of the rising edge and falling edge of the corresponding PWM signal g* by the half of the dead time DT (DT/2). This results in agreement between the on duration of the drive signal g*p and the on duration of the corresponding PWM signal g* before correction. Note that the rising edge of the drive signal g*p is delayed relative to that of the corresponding PWM signal g* before correction by the half of the dead time DT (DT/2).

Furthermore, it is assumed that a phase current i* (*=u, v, or w) is reversed from negative to positive during the on duration of the corresponding PWM signal from its rising edge to its falling edge (see FIG. 4C). In this assumption, a current flows through the upper-arm diode D*p during a dead time DT corresponding to the rising edge, and a current flows through the lower-arm diode D* during a dead time DT corresponding to the falling edge. For this reason, the on duration of a drive signal g*p for the upper-arm switching element is in agreement with the on duration of the corresponding PWM signal g*. Thus, in this case, the dead time compensator 34 sets the dead-time correction value Δv* to zero, in other words, the dead time compensator 34 does not correct the drive signal g*p.

The high-frequency signal setter 50 is operative to set a high-frequency command voltage signal Vhr consisting of a d-axis high-frequency component vdhr and a q-axis high-frequency component vqhr. In this embodiment, the q-axis high-frequency component vqhr is zero, and the d-axis high-frequency component vdhr is set such that its polarity is reversed every half cycle of the PWM task. The high-frequency command voltage signal Vhr has a frequency higher than an electric angular frequency of the motor-generator 10.

The high-pass filter 58 is operative to extract high-frequency components idh, iqh from the respective actual d-axis and q-axis current components id and iq. Note that the high-frequency components idh and iqh are components higher than the fundamental components of the actual d-axis and q-axis current components id and iq. Particularly, in this embodiment, frequency components that are the same as the high-frequency command voltage signal Vhr are extracted by the high-pass filter 58. As the high-pass filter 58, means for outputting components having the frequencies corresponding to the half cycle of the PWM signals for the actual d-axis and q-axis current components id and iq can be used.

The outer product calculator 60 is operative to calculate an outer product between the high-frequency command voltage signal Vhr (the d-axis high-frequency component vdhr and the q-axis high-frequency component vqhr) and the high-frequency components idh and iqh. The outer product serves as a parameter having a correlation with an angle formed by the vector of the high-frequency command voltage signal Vhr and the vector of the high-frequency components idh and iqh. That is, the outer product has a correlation with the rotational angle of the rotor (motor-generator 10).

Specifically, because of the salient structure of the rotor of the motor-generator 10, the motor-generator 10 has the inductance Ld smaller than the inductance Lq in the q-axis direction. This allows current to flow easier in the d-axis of the motor-generator 10 than that flowing in the q-axis thereof. For this reason, a high-frequency signal actually flowing (propagating) in the motor-generator 10 based on the superimposed high-frequency command voltage signal Vhr is biased toward the d-axis.

These characteristics of the high-frequency command voltage signal Vhr superimposed on the d-axis command voltage vdr allow the rotational angle θ of the motor-generator 10 to be reliably estimated. These characteristics have been described in U.S. Pat. No. 7,932,692 assigned to the same assignee as that of this application, and therefore, disclosures of which are incorporated herein by reference.

That is, in this embodiment, the outer product is an error-correlated parameter having a correlation with an error of the rotational angle θ of the motor-generator 10. The outer product as the error-correlated parameter is inputted to the velocity calculator 66.

The velocity calculator 66 is operative to compute an electrical angular velocity ω as the sum of a proportional gain term and an integral gain term of a proportional integral feedback algorithm using the outer product as its input.

In the proportional integral feedback algorithm, the angular velocity ω is expressed based on the proportional gain term and integral gain term.

The proportional gain term for the angular velocity ω contributes to change in the angular velocity ω in proportion to the temporal deviations of the angular velocity ω from a target angular velocity corresponding to the rotational angle θ of zero. The integral gain term is proportional to an accumulated offset of instantaneous values of the angular velocity ω over time to reset the accumulated offset (steady-state deviation) over time to zero.

The angle calculator 68 is operative to calculate the rotational angle θ of the motor-generator 10 as an integrated value of the angular velocity ω over time. Thus, the calculated rotational angle θ is a manipulated variable for feedback control of the outer product to its target value of zero. That is, the outer product serves as a parameter associated with the difference in phase between the high-frequency voltage signal Vhr and a high-frequency current signal (idh, iqh) actually flowing in the motor-generator 10. Making the outer product become zero allows the high-frequency command voltage signal Vhr to be superimposed on a direction in which the inductance is minimum, such as the real d-axis direction. In the first embodiment, the outer product calculator 60, the velocity calculator 66, and the angle calculator 68 serve as a calculating element.

That is, as described above, when the high-frequency command voltage signal Vhr is superimposed on the command voltage vdr in the d-axis for controlling a controlled variable of the motor-generator 10 as the output voltage of the inverter IV, the vector of the high-frequency components idh and iqh is directed to the d-axis direction. This results in that the outer product becomes zero. If the outer product is not zero, the calculated rotational angle θ is manipulated to make the outer product become zero, thus matching the calculated rotational angle θ with an actual rotational angle of the motor-generator 10.

Lets us assume the control system 100 without including the dead time compensator 34, and the magnitude of the high-frequency command voltage signal Vhr superimposed on the command voltage vdr in the d-axis is reduced with reduction in the ratio, to dead time DT, of the variation in the on duration or off duration of the corresponding drive signal g*#. In this assumption, an error contained in a voltage signal to be actually superimposed due to the dead time DT may become larger. This is a factor that reduces the accuracy of estimating the rotational angle θ of the motor-generator 10.

However, in the control system 100 according to the first embodiment, the dead time compensator 34 prevents the reduction in the accuracy of estimating the rotational angle θ in either the first case where a phase current i* is positive during a dead time DT (see FIG. 4A) or the second case where a phase current i* is negative during a dead time DT (see FIG. 4B) except for the third case where a phase current i* is reversed during the on duration of the drive signal g* from its rising edge to its falling edge.

The reasons for the prevention of the reduction in the accuracy of estimating the rotational angle θ in each of the first and second cases are as follows. Specifically, as illustrated in FIGS. 4A and 4B, the on duration of each of the drive signals gup, gun, gyp, gun, gwp, and gwn is defined by a corresponding one of the PWM signals gu, gv, and gw by the correction of the dead time compensator 34. Similarly, each of the drive signals gup, gun, gyp, gvn, gwp, and gwn is delayed in phase by the half of dead time DT (DT/2) relative to a corresponding one of the PWM signals gu, gv, and gw.

For these reasons, a line voltage based on a corrected PWM signal g* is in agreement with that defined based on a PWM signal g* before correction. That is, the PWM task with each of the drive signals gup, gun, gvp, gun, gwp, and gwn being delayed in phase by the DT/2 is equivalent to the PWM task with the carrier CS being delayed in phase by the DT/2, and therefore, the corresponding line voltage has no errors.

However, when a phase current i* (*=u, v, or w) is reversed from negative to positive during the on duration of the drive signal g* from its rising edge to its falling edge, the drive signal g*n corresponding to the phase (u, v, or w) of the reversed current i* is identical in phase to a corresponding PWM signal gu, gv, or gw. For this reason, the drive signal g*n corresponding to the phase (u, v, or w) of the reversed current i* leads by the half of dead time DT (DT/2) relative to the drive signals g*n corresponding to the other phases. Thus, a corresponding line voltage is delayed relative to that defined based on a PWM signal g* before correction, resulting in an error in the high-frequency command voltage signal Vhr.

Figure 5:
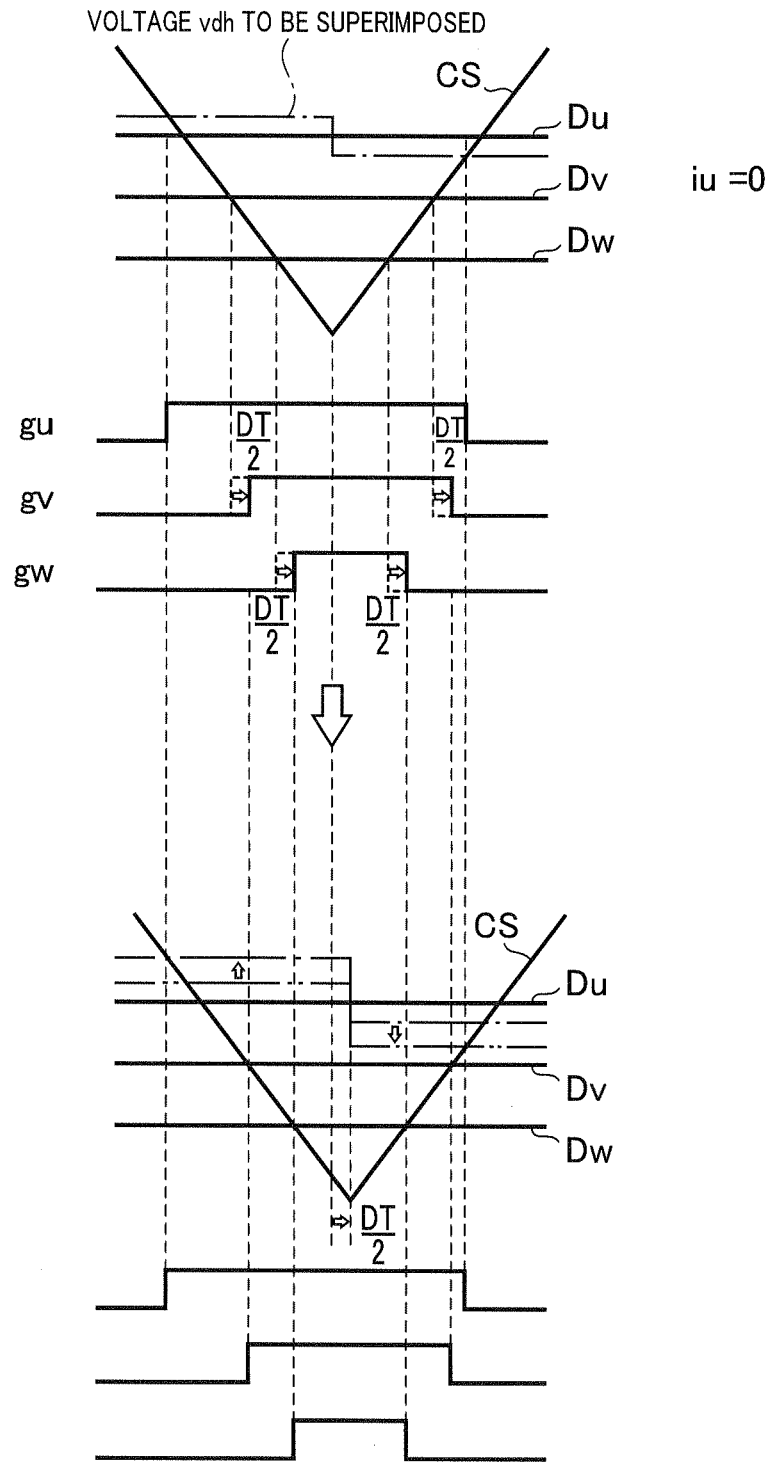
FIG. 5 is a timing chart schematically illustrating an example of PWM signals corrected by the dead time compensating task illustrated in FIG. 4C.

FIG. 5 schematically illustrates an example of PWM signals g* corrected by the dead time compensator 34. In FIG. 5, the PWM signal gu corresponds to a zero-cross period in which a corresponding phase current crosses through zero level, that is, reversed in polarity, so that a U-phase voltage leads in phase by half of dead time DT. In other words, in execution of the PWM task with the carrier CS retarding in phase by the half of the dead time DT, the U-phase voltage leads in phase by only the half of the dead time DT. Thus, if positive and negative parts of a high voltage signal vdh are successively superimposed on the duty signal Du within the respective first and second halves of the PWM cycle (see the dashed-dot line in FIG. 5), the amplitude of a high frequency voltage signal to be actually superimposed is increased (see the two-dot chain line in FIG. 5). Note that the high voltage signal vdh illustrated by the dashed-dot line in FIG. 5 is actually obtained by normalizing the d-axis high-frequency component vdhr of the high-frequency command voltage signal Vhr.

Figure 6:
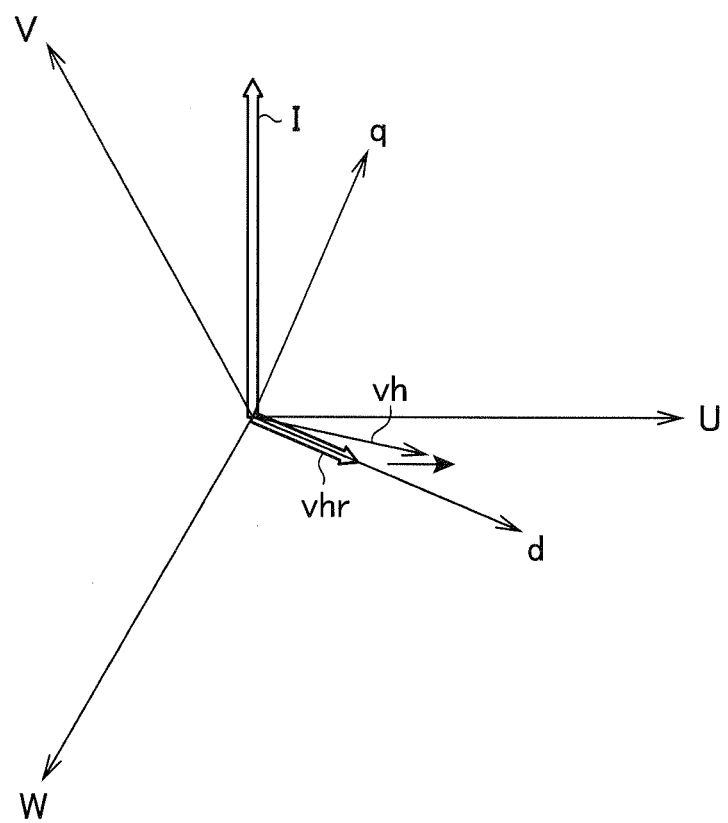
FIG. 6 is a vector diagram schematically illustrating an example of an error between an actually superimposed high-frequency voltage signal and a high-frequency command voltage signal according to the first embodiment.
Figure 7:
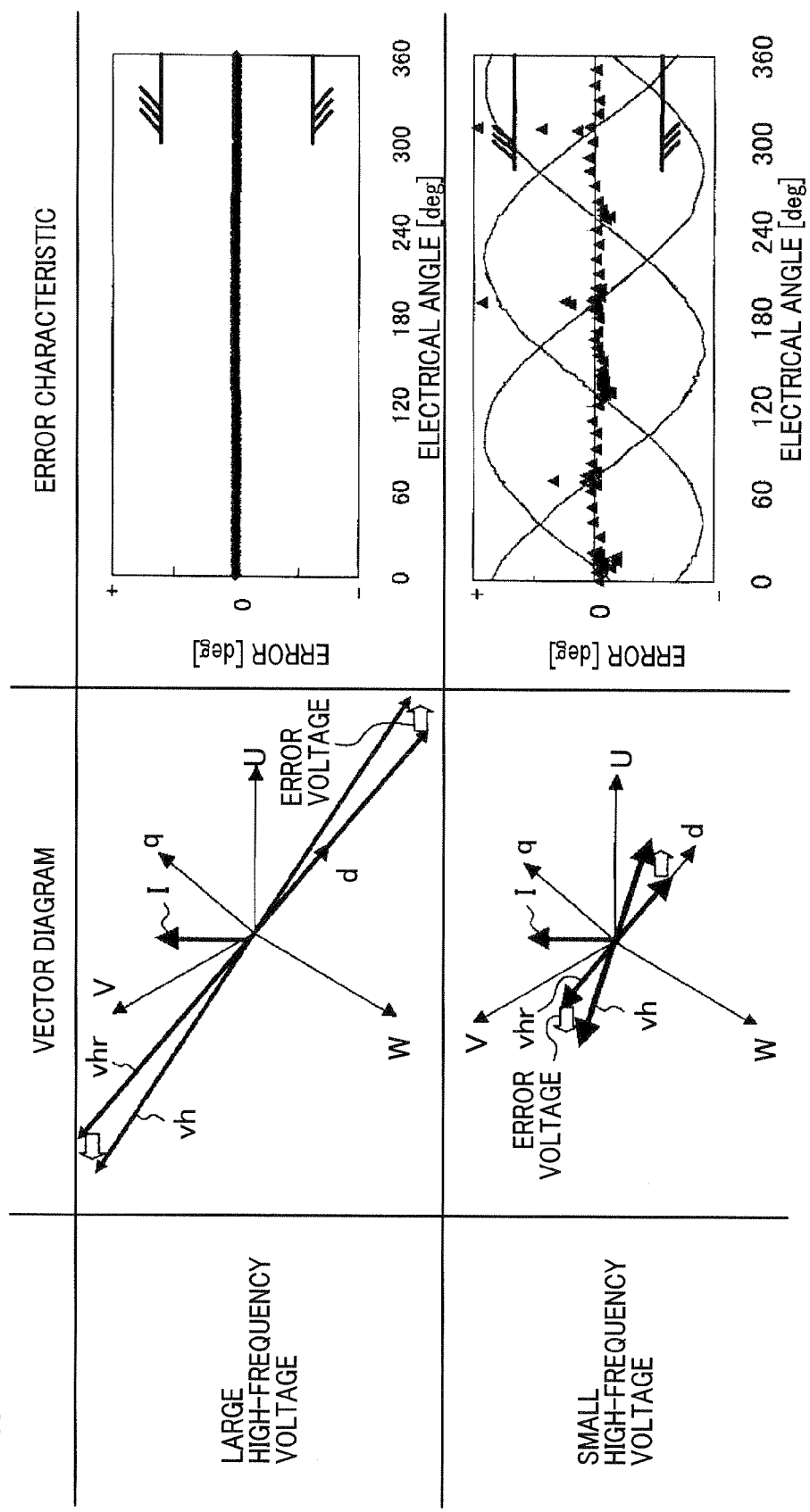
FIG. 7 is a combinational view of vector diagrams and timing charts schematically illustrating correlations between high-frequency voltage signals with high and low magnitudes and corresponding error characteristics according to the first embodiment.

For this reason, as illustrated in FIG. 6, if a phase current crosses zero level, a high-frequency voltage signal Vh to be actually superimposed has an error relative to the high-frequency command voltage signal Vhr, and the error increases with reduction in the magnitude of the high-frequency command voltage signal Vhr (see FIG. 7). If the control apparatus 14 did not carry out the following error reducing task, the error characteristics in the right side of FIG. 7 would be obtained.

That is, the top left of FIG. 7 shows the vectors of the high-frequency command voltage signal Vhr and the high-frequency voltage signal Vh to be actually superimposed, and an error voltage vector if the magnitude of the high-frequency command voltage signal Vhr is high. The top right of FIG. 7 shows the error characteristics corresponding to the vectors illustrated in the top left of FIG. 7. The error characteristics show the correlations between a variable of the rotational angle (electric angle) θ [deg] and a variable of the outer product, which is illustrated as "errors [deg]", between the high-frequency command voltage signal Vhr and the high-frequency components idh and iqh assuming that the rotational angle θ is correct.

In contrast, the bottom left of FIG. 7 shows the vectors of the high-frequency command voltage signal Vhr and the high-frequency voltage signal Vh to be actually superimposed, and an error voltage vector if the magnitude of the high-frequency command voltage signal Vhr is low. The bottom right of FIG. 7 shows the error characteristics corresponding to the vectors illustrated in the bottom left of FIG. 7. The error characteristics show the correlations between a variable of the rotational angle (electric angle) θ and a variable of the outer product between the high-frequency command voltage signal Vhr and the high-frequency components idh and iqh assuming that the rotational angle θ is correct.

As illustrated in FIG. 7, if the magnitude of the high-frequency command voltage signal Vhr is low, the outer product widely varies at and around zero cross points of phase currents, so that it is deviated from a correct value of zero.

Figure 8:
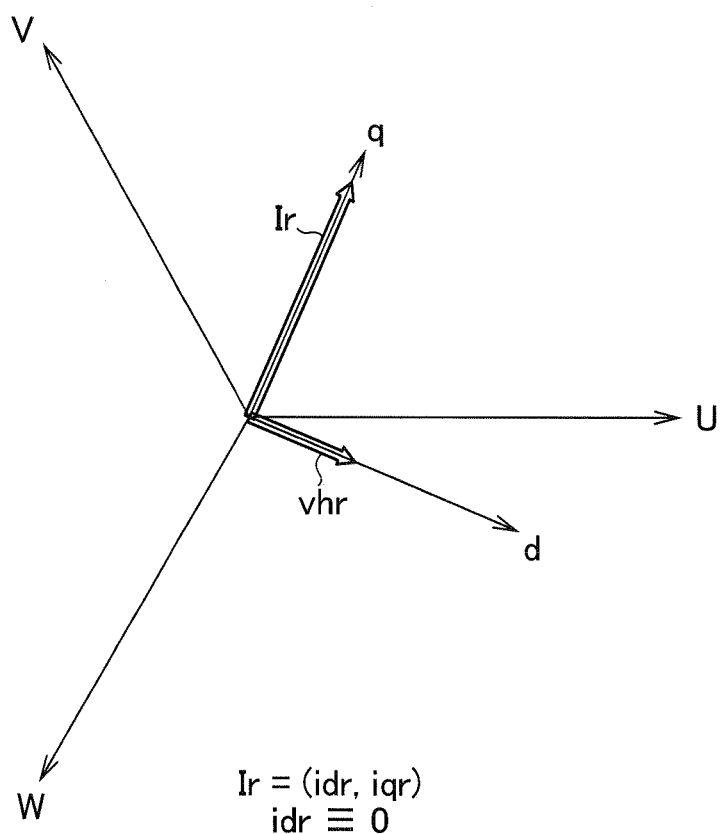
FIG. 8 is a vector diagram schematically illustrating an example of setting of a high-frequency command voltage signal according to the first embodiment.

Thus, the control apparatus 14 according to the first embodiment is configured to perform the error reducing task by setting the high-frequency command voltage signal Vhr such that the direction (vector) of the high-frequency command voltage signal Vhr is parallel to an error voltage vector due to dead time DT. Specifically, the command current setter 20 is operative to set a command current vector Ir consisting of the command d- and q-axis current components idr and iqr such that the command current vector Ir is directed in the direction of the q-axis, in other words, the command d-axis current component idr is set to zero (see FIG. 8). In the first embodiment, the command current setter 20 serves as a reducing element or a parallel setting element.

That is, when, for example, a U-phase current crosses zero level, a corresponding command current vector Ir is orthogonal to the U-phase axis of the stationary coordinate system. Thus, setting the command d-axis current component idr to zero allows the q-axis to be orthogonal to the U-phase axis.

This permits the d axis of the command current vector Ir to be parallel to the vector of a phase voltage that crosses zero level during a dead time DT. This makes it possible to set the high-frequency command voltage signal Vhr such that the direction (vector) of the high-frequency command voltage signal Vhr is parallel to an error voltage vector, thus reducing adverse affects of the error voltage vector on the outer product between the high-frequency command voltage signal Vhr and the high-frequency components idh and iqh.

Technical effects achieved by the control system 100 according to the first embodiment will be described hereinafter with reference to FIG. 9.

Figure 9:
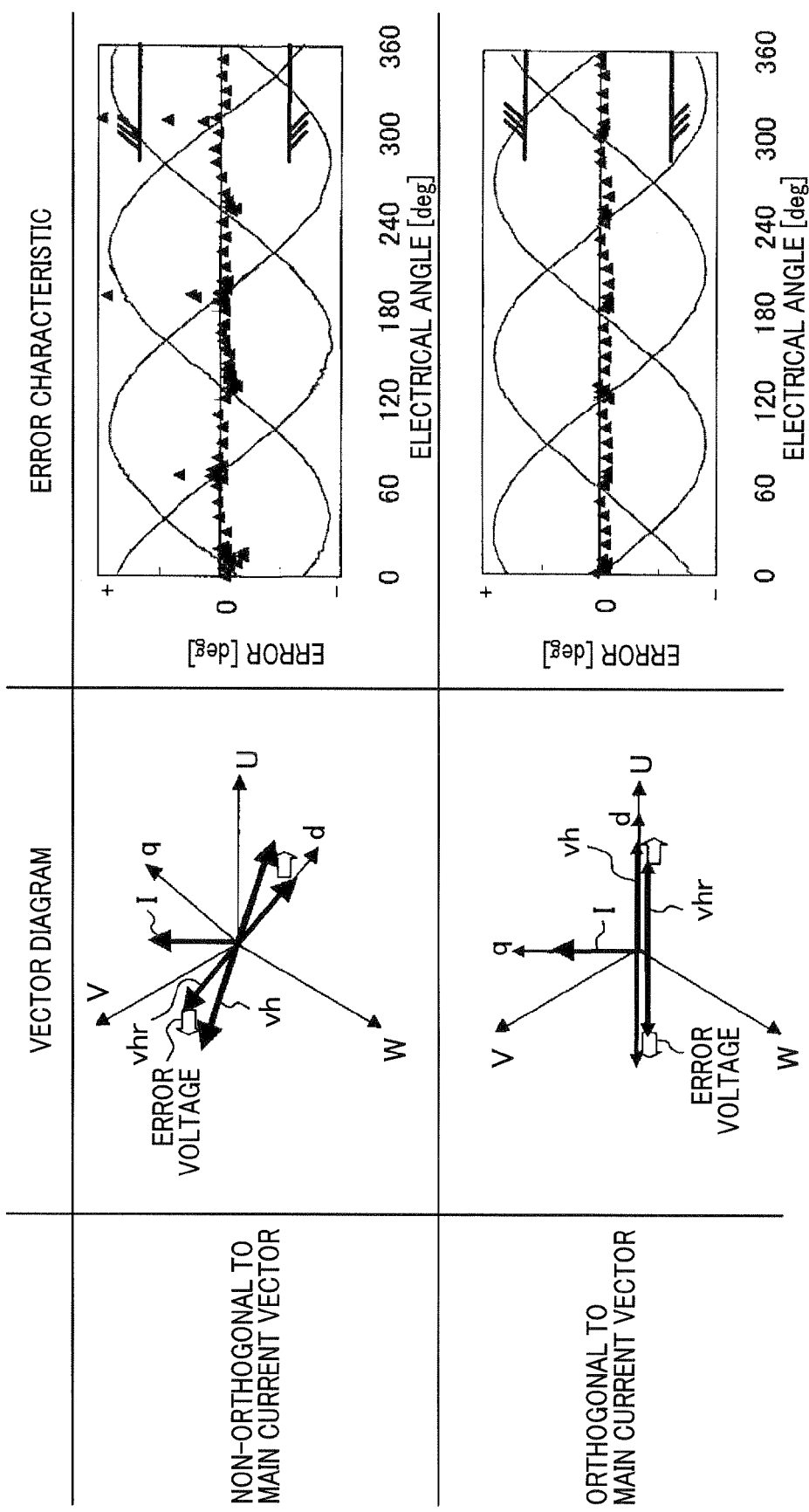
FIG. 9 is a combinational view of vector diagrams and timing charts schematically illustrating technical effects achieved in the first embodiment.

The top left of FIG. 9 shows the vectors of the high-frequency command voltage signal Vhr, the sed high-frequency voltage signal Vh to be actually superimposed, and an error voltage vector when the command current vector Ir is set to be non-orthogonal to the d axis, that is, non-parallel to the q axis. The top right of FIG. 9 shows the error characteristics corresponding to the vectors illustrated in the top left of FIG. 9. The error characteristics show the correlations between a variable of the rotational angle (electric angle) θ and a variable of the outer product between the high-frequency command voltage signal Vhr and the high-frequency components idh and iqh assuming that the rotational angle θ is correct.

In contrast, the bottom left of FIG. 9 shows the vectors of the high-frequency command voltage signal Vhr, the high-frequency voltage signal Vh to be actually superimposed, and an error voltage vector when the command current vector Ir is set to be orthogonal to the d axis, that is, parallel to the q axis. The bottom right of FIG. 9 shows the error characteristics corresponding to the vectors illustrated in the bottom left of FIG. 9. The error characteristics show the correlations between a variable of the rotational angle (electric angle) θ and a variable of the outer product between the high-frequency command voltage signal Vhr and the high-frequency components idh and iqh assuming that the rotational angle θ is correct.

FIG. 9 demonstrates that, if the current command vector Ir were non-orthogonal to the d axis in order to carry out maximum torque control to achieve maximum torque output with minimum armature current, the errors (values of the outer product) would widely vary at and around zero cross point of phase currents (see the top right of FIG. 9).

In contrast, because the control system 100 sets the current command vector Ir to be orthogonal to the d axis, the variation in the errors (values of the outer vector) is effectively reduced (see the bottom right of FIG. 9).

As described above, the control system 100 according to the first embodiment is configured to set a first line having the direction of the high-frequency command voltage signal Vhr to be parallel to the direction of an error voltage due to dead time. This configuration allows an angle formed by the first line and a line having the direction of a high-frequency voltage signal Vh to be actually superimposed to become zero. This achieves the first technical effect of reducing the variations in the outer product even if the magnitude of the high-frequency command voltage signal Vhr is set to be low.

The control system 100 according to the first embodiment is provided with the dead time compensator 34 that corrects the corresponding duty signal D* by adding the dead-time correction value Δv* thereto, thus delaying each of the rising edge and falling edge of the corresponding PWM signal g* by the half of the dead time DT (DT/2). This configuration achieves the second technical effect of preventing errors in the high-frequency voltage signal Vh to be actually superimposed if no phase currents cross zero level.

Second Embodiment

A control system for the motor-generator 10 according to the second embodiment of the present disclosure will be described with reference to FIGS. 10 to 14.

The structure and/or functions of the control system according to the second embodiment are different from the control system 100 by the following points. So, the different points will be mainly described hereinafter.

Figure 10:
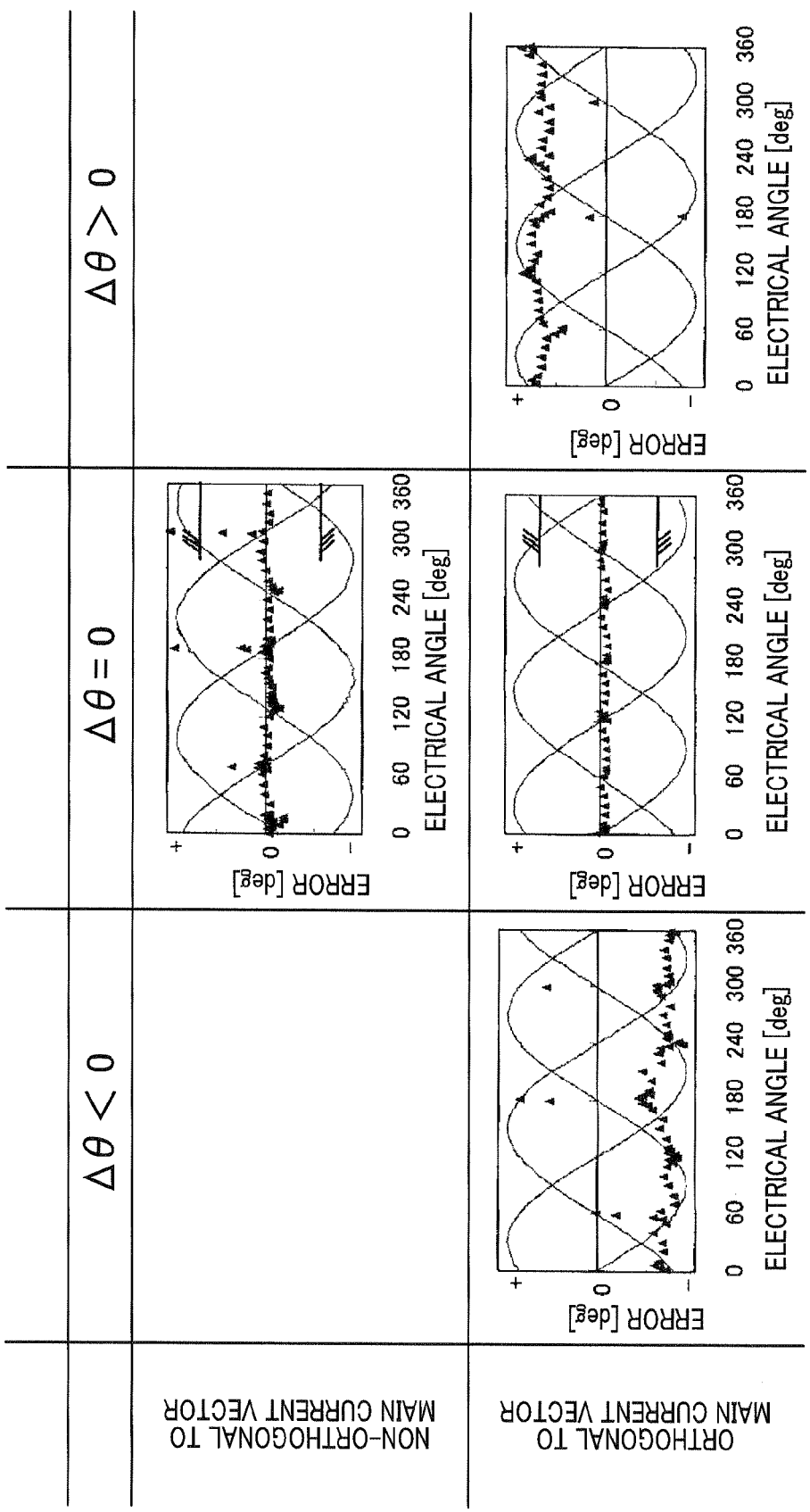
FIG. 10 are timing charts schematically illustrating three types of error characteristics, each of which is obtained if the rotational angle θ is set to a corresponding one of the three patterns defined based on the values of an error Δθ in the rotational angle Δθ according to the second embodiment of the present disclosure.

The bottom middle of FIG. 10 shows the error characteristics corresponding to the vectors illustrated in the bottom left of FIG. 9 if the rotational angle θ is correct (an error Δθ in the rotational angle θ is zero). The bottom left of FIG. 10 shows the error characteristics corresponding to the vectors illustrated in the bottom left of FIG. 9 if there is an error Δθ of a negative value (Δθ<0 degrees) in the rotational angle θ. The bottom right of FIG. 10 shows the error characteristics corresponding to the vectors illustrated in the bottom left of FIG. 9 if there is an error Δθ of a positive value (Δθ>0 degrees) in the rotational angle θ.

As illustrated in each of the bottom left and bottom right of FIG. 10, when there is a positive or negative error Δθ in the rotational angle θ, the outer product may vary widely at and around at least one zero cross point of at least one phase current even if the command current vector Ir is set to be orthogonal to the vector of the high-frequency command voltage signal Vhr. This arises in a case where the vector of an error voltage signal due to dead time is opposite in direction to the vector of the high-frequency command voltage signal Vhr.

Specifically, when a phase current crosses zero level from positive to negative (see (a) of FIG. 11), as illustrated in an example illustrated in (b) of FIG. 11, the direction of an error voltage vector is identical to that of the high-frequency command voltage signal Vhr. For this reason, a high-frequency voltage signal to be actually superimposed (the two-dot chain line in (b) of FIG. 11) increases in amplitude with respect to the high-frequency command voltage signal Vhr (the dashed-dot line in (b) of FIG. 11).

However, when a phase current crosses zero level from negative to positive (see (a) of FIG. 11), as illustrated in (c) of FIG. 11, the direction of an error voltage vector is opposite to that of the high-frequency command voltage signal Vhr. This results in that a high-frequency voltage signal to be actually superimposed (the two-dot chain line in (c) of FIG. 11) reduces in amplitude with respect to the high-frequency command voltage signal Vhr (the dashed-dot line in (c) of FIG. 11).

If the amount of reduction in the amplitude of the high-frequency voltage signal to be actually superimposed is large, the high-frequency voltage signal to be actually superimposed may become a voltage signal opposite in direction to the high-frequency command voltage signal Vhr. This is the reason why the outer product may widely vary at and around at least one zero cross point of at least one phase current. Thus, even if the command current vector Ir is set to be orthogonal to the vector of the high-frequency command voltage signal Vhr with an error $\Delta\theta$ contained in the rotational angle $\theta$, a direction on which the high-frequency command voltage signal Vhr is to be superimposed is deviated from the d axis, so that the d-axis component of the high-frequency command voltage signal Vhr is likely smaller than an error voltage due to dead time. This results in that the outer produce may widely vary at and around at least one zero cross point so as to be significantly deviated from a corresponding normal value.

Figure 12:
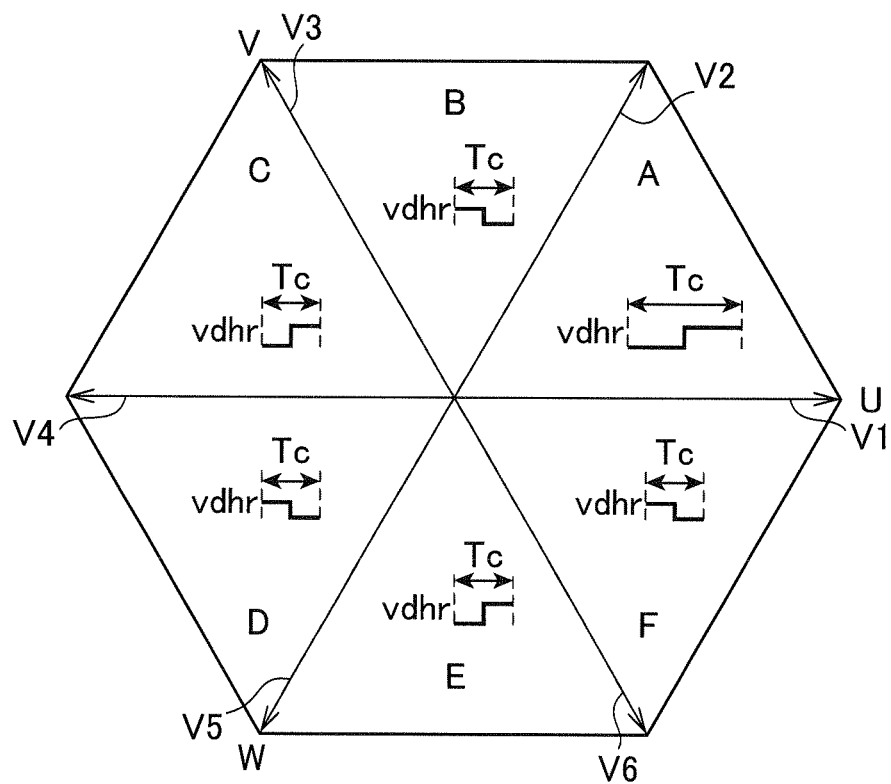
FIG. 12 is a view schematically illustrating a principal of reducing accuracy of calculation of the rotational angle of the rotary machine.

In order to address such circumstances, the control system according to the second embodiment is configured to alternately switch the polarity of the d-axis high-frequency component vdhr of the high-frequency command voltage signal Vhr within the first half of a cycle Tc of the PWM task while a main current vector I of the d-axis and q-axis current components id and iq is shifted in six areas A to F (see FIG. 12). The six areas A to F are partitioned by six voltage space vectors V1 to V6 defined in the stator of the motor-generator 10 by on-off states (modes) of the switching elements of the inverter IV.

This configuration is designed based on the fact that, while the main current vector I (id, iq) is rotated among the six areas A to F, the positive direction of the d axis is in agreement with the positive direction of each phase (U, V, or W), and the positive direction of the d axis is in agreement with the negative direction of each phase (U, V, or W).

Specifically, when the positive direction of the d axis of the main current vector I (id, iq) is in agreement with the positive direction of a phase voltage, the control system is configured to set the polarity of the d-axis high-frequency component vdhr of the high-frequency command voltage signal Vhr within the first half of a cycle Tc of the PWM task to positive. That is, when the positive direction of the d axis of the main current vector I (id, iq) is in agreement with the positive direction of a phase voltage, a corresponding phase current will cross zero level from positive to negative, resulting in the case illustrated in (b) of FIG. 11.

In contrast, with the positive direction of the d axis of the main current vector I (id, iq) being in agreement with the negative direction of a phase voltage, if the control system set the polarity of the d-axis high-frequency component vdhr of the high-frequency command voltage signal Vhr within the first half of a cycle Tc of the PWM task to positive, the case illustrated in (c) of FIG. 11 would occur. This is because, when the positive direction of the d axis of the main current vector I (id, iq) is in agreement with the negative direction of a phase voltage, a corresponding phase current will cross zero level from negative to positive, resulting in the case illustrated in (c) of FIG. 11.

Thus, the control system according to the second embodiment is configured to set the polarity of the d-axis high-frequency component vdhr of the high-frequency command voltage signal Vhr within the first half of a cycle Tc of the PWM task to negative with the positive direction of the d axis being in agreement with the negative direction of a phase voltage. This results in the case illustrated in (b) of FIG. 11.

Figure 13:
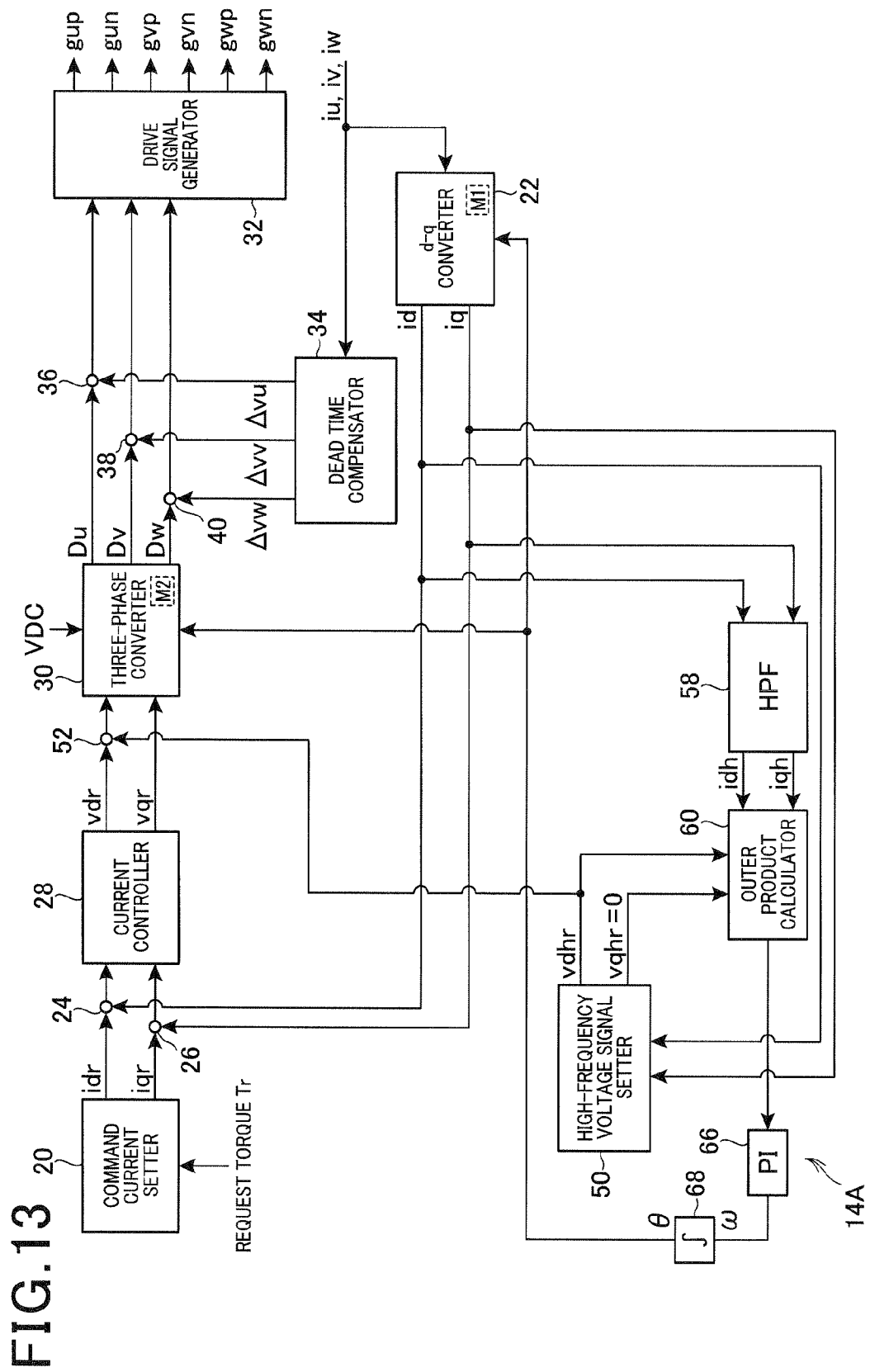
FIG. 13 is a block diagram schematically illustrating functional modules of a control apparatus equivalent to tasks to be executed thereby according to the second embodiment.

Specifically, referring to FIG. 13, a control apparatus 14A according to the second embodiment is configured such that the high-frequency signal setter 50, serving as a parallel setting element, captures the actual d-axis and q-axis current components id and iq from the d-q converter 22. The control apparatus 14A sets the polarity of the d-axis high-frequency component vdhr of the high-frequency command voltage signal Vhr according to whether the positive direction or the negative direction of the d axis based on the actual d-axis and q-axis current components id and iq is in agreement with the positive direction of a U-, V-, or W-phase voltage. The remaining components of the control apparatus 14A, to which like reference characters of the corresponding components of the control apparatus 14 illustrated in FIG. 2 are assigned, are omitted or simplified in description.

Because any two adjacent space voltage vectors in the space voltage vectors V1 to V6 form an electrical angle of 60 degrees, the areas A to F are switched every rotational angle $\theta$ of 60 electrical degrees. Thus, the high-frequency signal setter 50 is configured to switch the polarity of the d-axis high-frequency component vdhr of the high-frequency command voltage signal Vhr every rotational angle $\theta$ of 60 electrical degrees.

Figure 14:
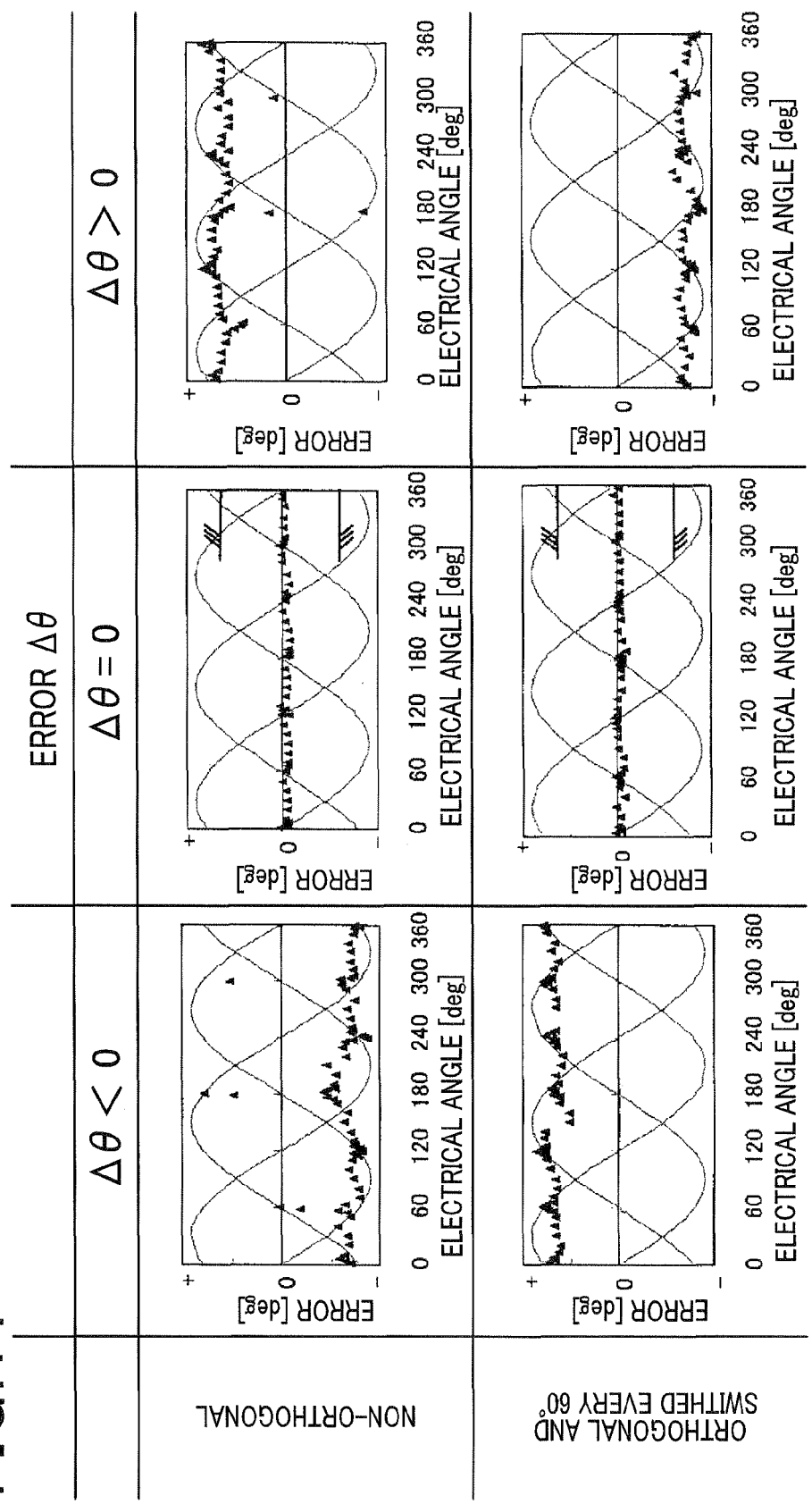
FIG. 14 is timing charts schematically illustrating technical effects achieved in the first embodiment.

The top middle, the top left, and the top right of FIG. 14 correspond to the bottom middle, the bottom left, and the bottom right of FIG. 10, respectively.

The bottom middle of FIG. 14 shows the error characteristics corresponding to the vectors illustrated in the bottom left of FIG. 9 upon the polarity of the d-axis high-frequency component vdhr of the high-frequency command voltage signal Vhr being switched every rotational angle $\theta$ of 60 electrical degrees if the rotational angle $\theta$ is correct (an error $\Delta\theta$ 0 in the rotational angle $\theta$ is zero).

The bottom left of FIG. 14 shows the error characteristics corresponding to the vectors illustrated in the bottom left of FIG. 9 upon the polarity of the d-axis high-frequency component vdhr of the high-frequency command voltage signal Vhr being switched every rotational angle $\theta$ of 60 electrical degrees if there is an error $\Delta\theta$ of a negative value ($\Delta\theta<0$ degrees) in the rotational angle $\theta$.

The bottom right of FIG. 14 shows the error characteristics corresponding to the vectors illustrated in the bottom left of FIG. 9 upon the polarity of the d-axis component vdhr of the high-frequency command voltage signal Vhr being switched every rotational angle $\theta$ of 60 electrical degrees if there is an error $\Delta\theta$ of a positive value ($\Delta\theta>0$ degrees) in the rotational angle $\theta$.

The bottom left and the bottom right of FIG. 14 clearly demonstrate that the variation of the outer product can be reduced even if the rotational angle $\theta$ has a positive or negative error $\Delta\theta$.

As described above, the control system 100 according to the second embodiment is configured to switch the polarity of the d-axis component vdhr of the high-frequency command voltage signal Vhr such that the direction of an error voltage vector due to dead time is in agreement with that of the vector of the high-frequency command voltage signal Vhr. This configuration achieves, in addition to the first and second technical effects, the third technical effect of preventing cancellation of the high-frequency command voltage signal Vhr the error voltage due to the dead time.

The control system 100 according to the second embodiment is also configured to switch the polarity of the d-axis component vdhr of the high-frequency command voltage signal Vhr every rotational angle θ of 60 electrical degrees. This configuration achieves, in addition to the first to third technical effects, the fourth technical effect of facilitating setting the polarity of the d-axis component vdhr of the high-frequency command voltage signal Vhr to a proper polarity prior to the occurrence of a corresponding dead time.

Third Embodiment

A control system for the motor-generator 10 according to the third embodiment of the present disclosure will be described with reference to FIG. 15.

The structure and/or functions of the control system according to the third embodiment are different from the control system according to the second embodiment by the following points. So, the different points will be mainly described hereinafter.

Figure 15:
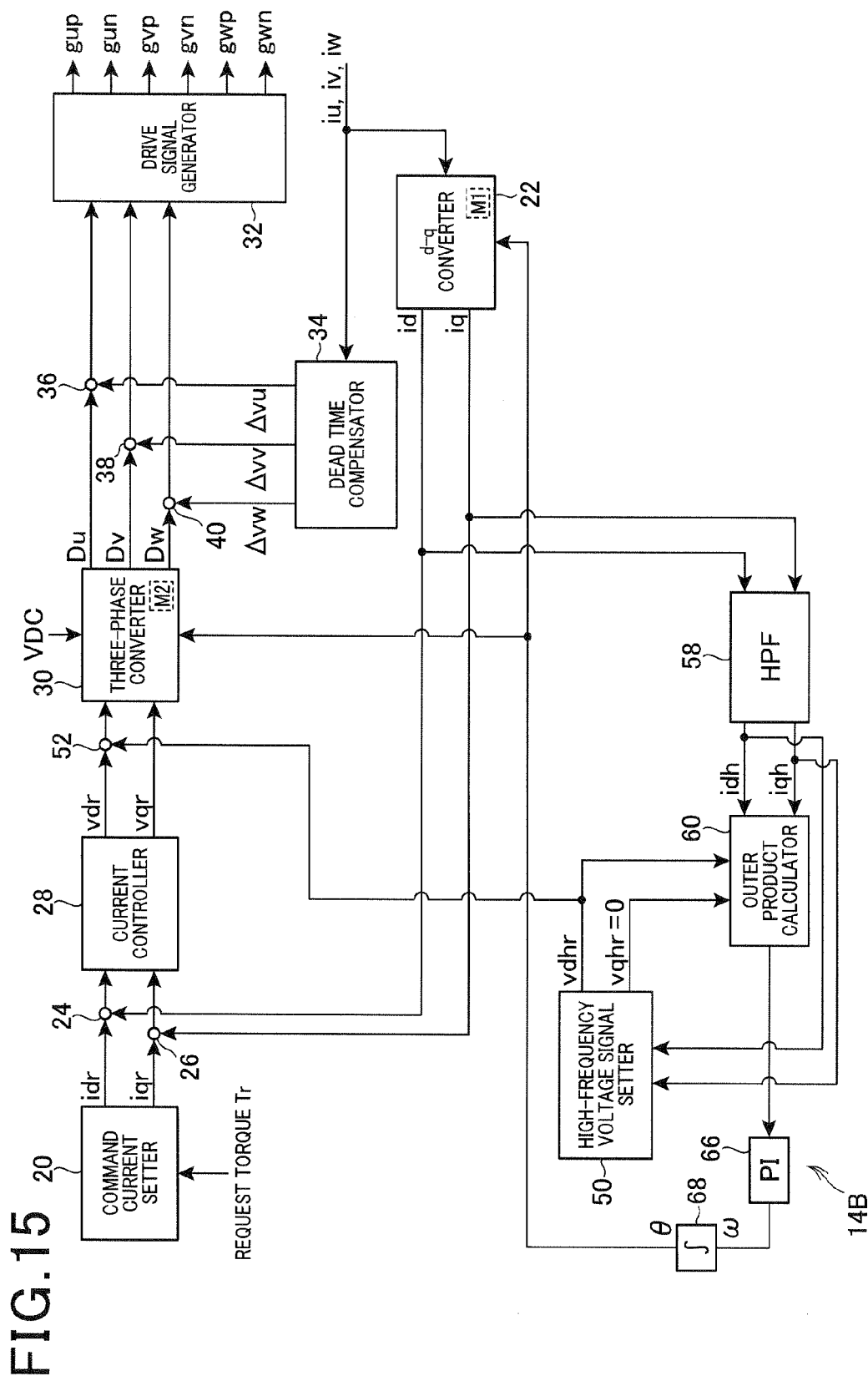
FIG. 15 is a block diagram schematically illustrating functional modules of a rotational-angle calculation process equivalent to tasks to be executed by a control system

Referring to FIG. 15, a control apparatus 14B according to the third embodiment is configured such that the high-frequency signal setter 50 switches, based on the high-frequency components idh and iqh extracted by the high-pass filter 58, the polarity of the d-axis component vdhr of the high-frequency command voltage signal Vhr only when the norm of the vector of the high-frequency components idh and iqh is equal to or smaller than a preset threshold. This configuration is particularly effective when a zero-cross period of a phase current is longer than a period during which a third line having the direction defined by the high-frequency command voltage signal Vhr is parallel to a fourth line having a present direction of the stator, such as a line corresponding to the positive direction of a U-, V-, or W-phase voltage in the stator coordinate system.

Specifically, if an error voltage is generated within a zero-cross period before the third line is parallel to the fourth line, the components of the high-frequency command voltage signal Vhr in the error voltage are smaller than those of the high-frequency command voltage signal Vhr in the error voltage obtained when the third line is parallel to the fourth line. For this reason, even if the polarity of the high-frequency command voltage signal Vhr is opposite to that defined by the control apparatus 14A according to the second embodiment, the high-frequency command voltage signal Vhr is not cancelled by an error voltage due to dead time so much in comparison to the high-frequency command voltage signal Vhr if the third line is parallel to the fourth line.

However, in this case, the norm of the vector of the high-frequency components idh and iqh becomes small. Thus, the high-frequency signal setter 50 is capable of grasping, based on the norm of the vector of the high-frequency components idh and iqh, that the polarity of the high-frequency command voltage signal Vhr is opposite to that defined by the control apparatus 14A according to the second embodiment.

As described above, the control system 100 according to the third embodiment is configured to determine, based on the norm of the vector of the high-frequency components idh and iqh, the direction of the vector of the high-frequency command voltage signal Vhr within the first half of the update cycle of each of the duty signals Du, Dv, and Dw; this update cycle corresponds to the PWM cycle. This configuration achieves, in addition to the first, second, and third technical effects, the fifth technical effect of properly determining whether to reverse the direction of the vector of the high-frequency command voltage signal Vhr, in other words, whether to reverse the polarity of the d-axis component vdhr of the high-frequency command voltage signal Vhr.

Fourth Embodiment

A control system for the motor-generator 10 according to the fourth embodiment of the present disclosure will be described with reference to FIG. 16.

The structure and/or functions of the control system according to the fourth embodiment are different from the control system according to the first embodiment by the following points. So, the different points will be mainly described hereinafter.

Figure 16:
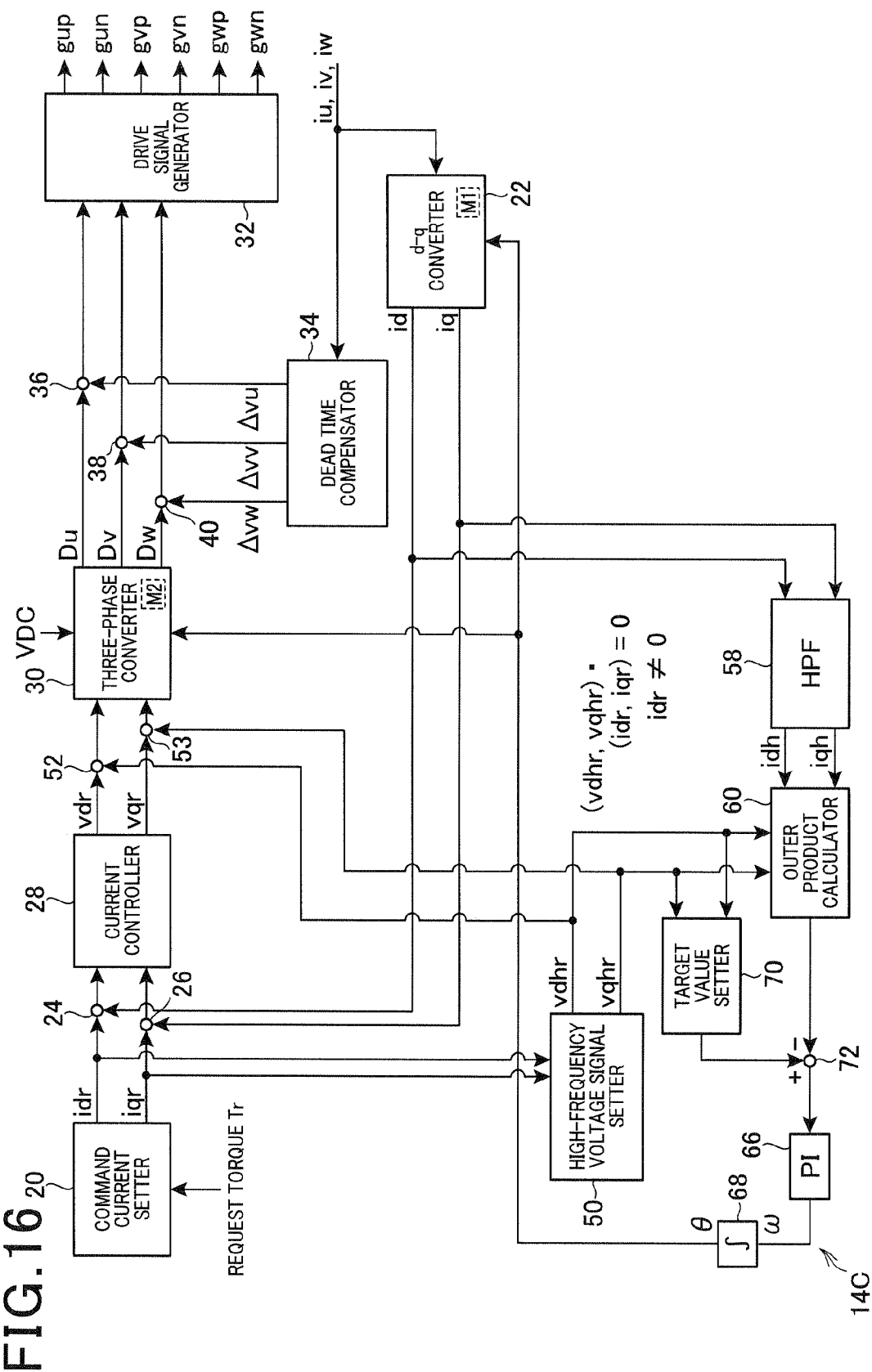
FIG. 16 is a block diagram schematically illustrating functional modules of a control apparatus equivalent to tasks to be executed thereby according to the fourth embodiment.

Referring to FIG. 16, a control apparatus 14C according to the fourth embodiment is configured such that the command current setter 20 sets the command current vector Ir (idr, iqr) to be non-orthogonal to the d axis in order to carry out maximum torque control to achieve maximum torque output with minimum armature current. That is, the command current setter 20 sets the command d-axis current component idr to be unequal to zero. The control apparatus 14C according to the fourth embodiment is configured such that the high-frequency signal setter 50 sets the high-frequency command voltage signal Vhr of the d-axis high-frequency component vdhr and the q-axis high-frequency component vqhr to be orthogonal to the command current vector Ir (idr, iqr). In this configuration, even if no errors are included in the rotational angle high-frequency command voltage signal θ of the motor-generator 10, the outer product output from the outer product calculator 60 is set to be unequal to zero.

Thus, the control apparatus 14C according to the fourth embodiment is further provided with a target value setter 70 and a deviation calculator 72.

The control apparatus 14C is configured to manipulate the calculated rotational angle θ such that the outer product calculated by the outer product calculator 60 becomes a target value set by the target value setter 70. The target value setter 70 is configured to set the target value based on the d-axis high-frequency component vdhr and the q-axis high-frequency component vqhr of the high-frequency command voltage signal Vhr.

That is, the control apparatus 14C manipulates the calculated rotational angle θ such that the output of the deviation calculator 72 as the deviation of the outer product from the target value becomes zero.

Note that, in this embodiment, the q-axis high-frequency component vqhr of the high-frequency command voltage signal Vhr is unset to be zero. For this reason, the command voltage vqr in the q-axis to be inputted to the three-phase converter 30 is corrected by superimposing the q-axis high-frequency component vqhr on the command voltages vqr by a superimposing unit 53, and the corrected command voltages vqr is inputted to the three-phase converter 30 as the command voltage vqr.

As described above, the control system 100 according to the fourth embodiment is configured to set the vector of the high-frequency command voltage signal Vhr (vdhr, vqhr) to be orthogonal to the command current vector Ir (idr, iqr) as a reference of the vector of the high-frequency command voltage signal Vhr (vdhr, vqhr). This configuration achieves, in addition to the first and second technical effects, the sixth technical effect of determining the command current vetter Ir (idr, iqr) in accordance with information requested from the control of the controlled variable of the motor-generator 10.

Fifth Embodiment

A control system for the motor-generator 10 according to the fifth embodiment of the present disclosure will be described with reference to FIG. 17.

The structure and/or functions of the control system according to the fifth embodiment are different from the control system 14C according to the fourth embodiment by the following points. So, the different points will be mainly described hereinafter.

Figure 17:
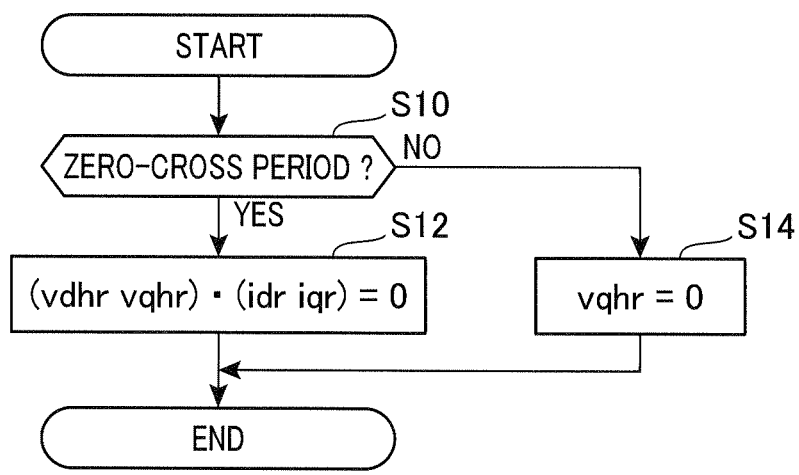
FIG. 17 is a flowchart schematically illustrating a setting task of the high-frequency command voltage signal according to the fifth embodiment of the present disclosure.

FIG. 17 is a flowchart schematically illustrating the setting task of the high-frequency command voltage signal Vhr (vdhr, vqhr) according to the fifth embodiment; the setting task is to be repeatedly executed by the control apparatus 14 every preset cycle.

In step S10, the control apparatus 14 determines whether there is a zero-cross period in which a phase current crosses zero level based on, for example, the actual instantaneous U-, V-, and W-phase alternating currents iu, iv, and iw. When determining that there is a zero-cross period (YES in step S10), the control apparatus 14 sets the vector of the high-frequency command voltage signal Vhr (vdhr, vqhr) to be orthogonal to the command current vector Ir (idr, iqr) in step S12.

Otherwise, when determining that there is not a zero-cross period (NO in step S10), the control apparatus 14 sets the q-axis high-frequency component vqhr of the high-frequency command voltage signal Vhr (vdhr, vqhr) to be zero in step S14. The operation in step S14 is based on the fact that no errors due to dead time occur during any period except for zero-cross periods.

After completion of either the operation in step S12 or step S14, the setting task is terminated.

As described above, the control system 100 according to the fifth embodiment is configured to change the direction of the vector of the high-frequency command voltage signal Vhr (vdhr, vqhr) to be orthogonal to the command current vector Ir (idr, iqr) as a current for controlling the controlled variable of the motor-generator 10. This configuration achieves, in addition to the fourth technical effect, the seventh technical effect of setting the vector of the high-frequency command voltage signal Vhr (vdhr, vqhr) to be directed to the direction of the d axis when there are periods except for during zero-cross periods.

Sixth Embodiment

A control system for the motor-generator 10 according to the sixth embodiment of the present disclosure will be described with reference to FIG. 18.

The structure and/or functions of the control system according to the sixth embodiment are different from the control system according to the first embodiment by the following points. So, the different points will be mainly described hereinafter.

Figure 18:
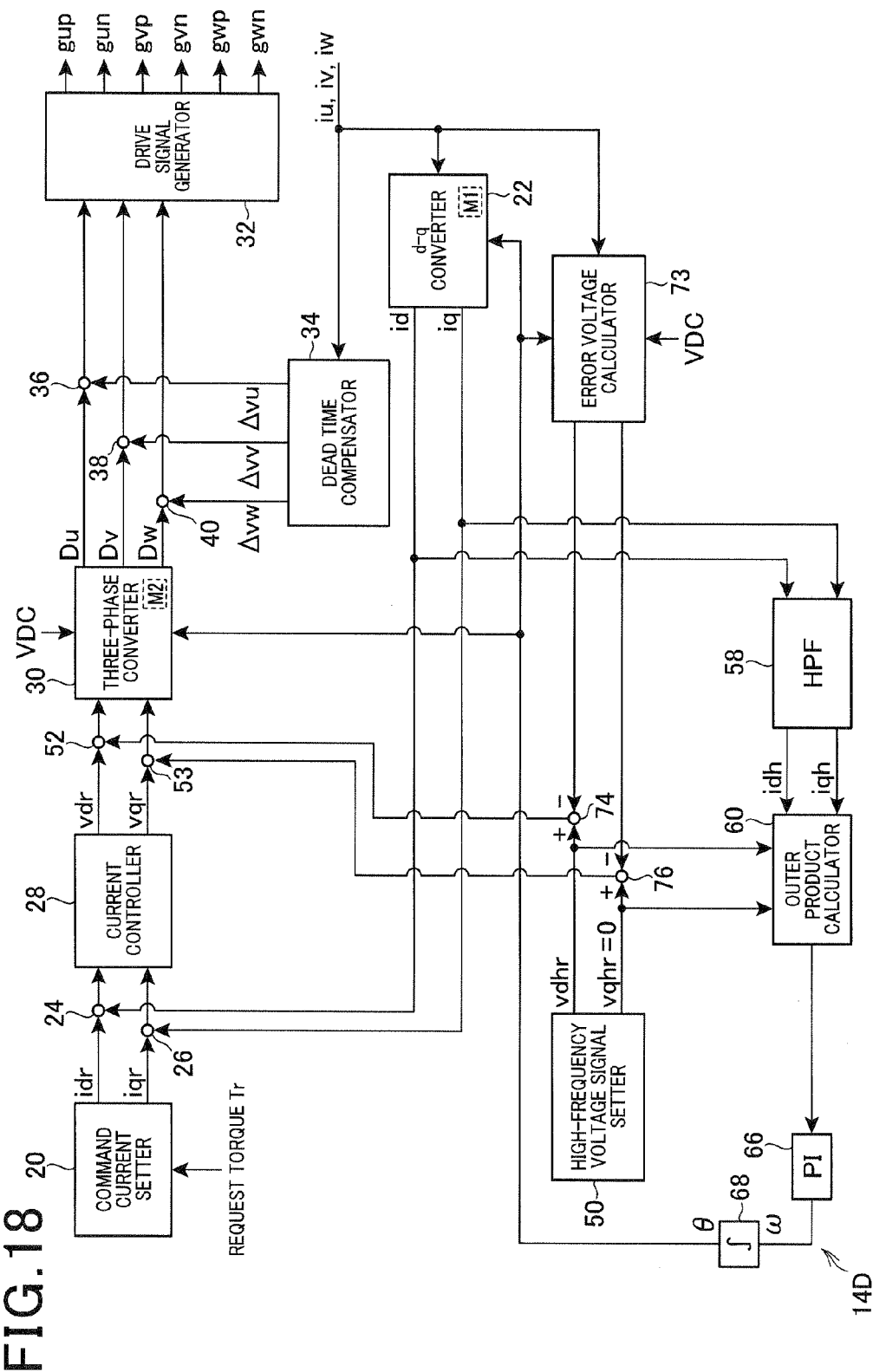
FIG. 18 is a block diagram schematically illustrating functional modules of a control apparatus equivalent to tasks to be executed thereby according to the sixth embodiment.

Referring to FIG. 18, a control apparatus 14D according to the sixth embodiment is configured to correct the high-frequency command voltage signal Vhr set by the high-frequency signal setter 50, and control the inverter IV based on the corrected high-frequency command voltage signal Vhr.

Specifically, the control apparatus 14D includes an error voltage calculator 73, an error voltage corrector 74, and an error voltage corrector 76.

The error voltage calculator 73 is operative to calculate an error voltage based on the inverter input voltage VDC, the rotational angle θ, and the actual instantaneous U-, V-, and W-phase alternating currents iu, iv, and iw. The actual instantaneous U-, V-, and W-phase alternating currents iu, iv, and iw are used to detect a zero-cross period. The error voltages calculated by the error voltage calculator 73 are illustrated in FIG. 19. Specifically, for example, when the rising edge of the on duration of the drive signal gup is shifted to lead by the half of dead time DT relative to the on durations of the other phase drive signals within a zero-cross period for a u-phase current, the U-phase component of the output voltage of the inverter IV is changed from 0 to the inverter input voltage VDC. Thus, the d-phase component vde of a corresponding error voltage is expressed as the following equation:

$$vde = \alpha \cdot VDC \cdot \sqrt{2/3} \cdot \cos\theta$$

where α represents the ratio (DT/Tc).

Similarly, the q-phase component vqe of the corresponding error voltage is expressed as the following equation:

$$vqe = -\alpha \cdot VDC \cdot \sqrt{2/3} \cdot \sin\theta$$

The error corrector 74 is operative to subtract, from the d-axis component vdhr of the high-frequency command voltage signal Vhr (vdhr, vqhr) set by the high-frequency signal setter 50, the d-phase component vde of the error voltage calculated by the error voltage calculator 73. Similarly, the error corrector 76 is operative to subtract, from the q-axis high-frequency component vqhr of the high-frequency command voltage signal Vhr (vdhr, vqhr) set by the high-frequency signal setter 50, the q-phase component vqe of the error voltage calculated by the error voltage calculator 73.

That is, a d-axis component of a correction voltage has a magnitude identical to that of the d-phase component vde of the error voltage, and a polarity opposite to that of the d-phase component vde of the error voltage. Similarly, a q-axis component of the correction voltage has a magnitude identical to that of the q-phase component vqe of the error voltage, and a polarity opposite to that of the q-phase component vqe of the error voltage. These d- and q-axis components of the correction voltage can cancel the corresponding error voltage due to dead time.

The superimposing unit 52 is operative to correct the command voltages vdr outputted from the current controller 28 by superimposing the output of the error corrector 74 on the command voltages vdr, and input the corrected command voltages vdr to the three-phase converter 30 as the command voltage vdr.

Similarly, the superimposing unit 53 is operative to correct the command voltages vqr outputted from the current controller 28 by superimposing the output of the error corrector 76 on the command voltages vqr, and input the corrected command voltages vqr to the three-phase converter 30 as the command voltage vqr.

Note that, to the outer calculator 60, the high-frequency command voltage signal Vhr (vdhr, vqhr), which has not been corrected yet by the error correctors 74 and 76, is inputted. This is because the error correctors 74 and 76 serve as a corrector configured to set an actual high-frequency voltage signal included in the output voltage of the inverter IV to a high-voltage command signal.

As described above, the control system 100 according to the sixth embodiment is configured to drive the inverter IV based on the high-frequency command voltage signal Vhr (vdhr, vqhr) corrected based on the d- and q-phase components vde and vqe of the corresponding error voltage. This configuration achieves, in addition to the second technical effect, the eighth technical effect of performing feedforward compensation of the high-frequency command voltage signal Vhr (vdhr, vqhr) to cancel the error voltage due to dead time in open-loop control of a high frequency voltage signal to be actually superimposed to the high-frequency command voltage signal Vhr (vdhr, vqhr).

Seventh Embodiment

A control system for the motor-generator 10 according to the seventh embodiment of the present disclosure will be described with reference to FIG. 20.

The structure and/or functions of the control system according to the seventh embodiment are different from the control system according to the first embodiment by the following points. So, the different points will be mainly described hereinafter.

Figure 20:
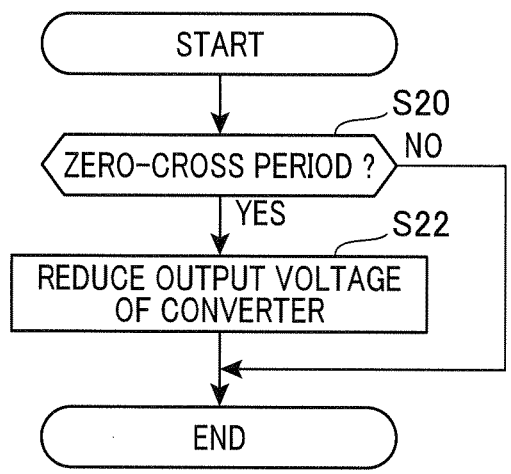
FIG. 20 is a flowchart schematically illustrating a task of reducing the accuracy of calculation of the rotational angle according to the seventh embodiment of the present disclosure.

FIG. 20 is a flowchart schematically illustrating a task of reducing the accuracy of calculation of the rotational angle θ of the motor-generator 10; the task is to be executed by the control apparatus 14 every preset cycle.

In step S20, the control apparatus 14 determines whether there is currently in a zero-cross period in which a phase current crosses zero level based on, for example, the actual instantaneous U-, V-, and W-phase alternating currents iu, iv, and iw. When determining that there is currently in a zero-cross period (YES in step S20), the control apparatus 14 reduces the output voltage of the converter CV in step S22. The operation in step S22 aims to increase the root-mean square value of the high-frequency command voltage signal Vhr relative to an error voltage due to dead time. Specifically, reduction in the output voltage of the converter CV (the inverter input voltage) allows the high-frequency command voltage signal Vhr normalized by the power supply voltage (the inverter input voltage) VDC to be increased even if the norm of the high-frequency command voltage signal Vhr is kept unchanged.

For this reason, the variation in the pulse width of each PWM signals g* is increased based on the superimposition of the d- and q-axis high-frequency components vdhr and vqhr of the high-frequency command voltage signal Vhr on the respective command voltages vdr and vqr. This makes it possible to reduce the adverse affect of an error voltage due to dead time on the high-frequency command voltage signal Vhr.

Otherwise, when determining that there is not currently in a zero-cross period (NO in step S20) or after completion of the operation in step S22, the task illustrated in FIG. 20 is terminated.

Eighth Embodiment

A control system for the motor-generator 10 according to the eighth embodiment of the present disclosure will be described with reference to FIG. 21.

The structure and/or functions of the control system according to the eighth embodiment are different from the control system according to the first embodiment by the following points. So, the different points will be mainly described hereinafter.

Figure 21:
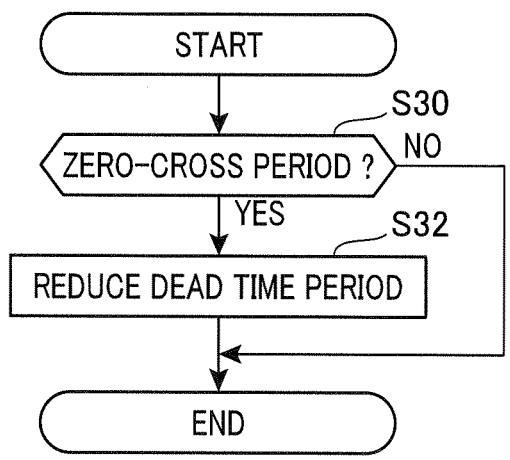
FIG. 21 is a flowchart schematically illustrating a task of reducing the accuracy of calculation of the rotational angle according to the eighth embodiment of the present disclosure.

FIG. 21 is a flowchart schematically illustrating a task of reducing the accuracy of calculation of the rotational angle θ of the motor-generator 10; the task is to be executed by the control apparatus 14 every preset cycle.

In step S30, the control apparatus 14 determines whether there is a zero-cross period in which a phase current crosses zero level based on, for example, the actual instantaneous U-, V-, and W-phase alternating currents iu, iv, and iw. When determining that there is a zero-cross period (YES in step S30), the control apparatus 14 reduces the length of a corresponding dead time in step S32. The operation in step S32 aims to increase the ratio of the root-mean square value of the high-frequency command voltage signal Vhr to an error voltage due to dead time.

Otherwise, when determining that there is not a zero-cross period (NO in step S30) or after completion of the operation in step S32, the task illustrated in FIG. 21 is terminated.

The first to eighth embodiments and their modifications can be changed and/or modified within the scope of the present disclosure.

A parallel setting element according to the present disclosure is not limited to the control apparatus 14 using the dead time compensator 34. If the control apparatus 14 is configured without using the dead time compensator 34, error voltages due to dead times may occur in periods in addition to zero-cross periods, and they may be changed depending on the polarities of three-phase currents (see FIG. 4). In this modification, the high-frequency signal setter 50 is configured to set the high-frequency command voltage signal Vhr (vdhr, vqhr) based on each of the directions of the error voltages each due to a corresponding dead time. Note that each of the error voltages can be calculated based on the correlations illustrated in FIG. 19.

Note that, in the first embodiment as an example, if the request torque Tr is set to zero, the high-frequency signal setter 50 can set the d-phase component vdhr of the high-frequency command voltage signal Vhr to zero.

As a direction determining element, the control system 100 according to the second embodiment is configured to switch the polarity of the d-axis component vdhr of the high-frequency command voltage signal Vhr every rotational angle θ of 60 electrical degrees, but the present disclosure is not limited thereto. Specifically, the control system 100 can be configured to switch the polarity of the d-axis component vdhr of the high-frequency command voltage signal Vhr every rotational angle θ of 60/n electrical degrees; n is an integer of any one of 2, 3, . . . , such as 30 electrical degrees and 15 electrical degrees. Note that the integer n is set such that each area in which a corresponding polarity is maintained is wider than a corresponding zero-cross region of each phase current.

How to determine the polarity of the d-axis high-frequency component vdhr of the high-frequency command voltage signal Vhr within the first half of a PWM cycle Tc based on a direction of the stationary coordinate system defined on the stator is not limited to the method described as an example in the second embodiment.

For example, the control system according to the second embodiment can be configured to set the polarity of the high-frequency command voltage signal Vhr to positive by default. Then, the control system can be configured to reverse the polarity of the d-axis high-frequency component vdhr of the high-frequency command voltage signal Vhr only when it is determined that there is a zero-cross period based on the direction of the main current vector I (id, iq).

For example, the high-frequency command voltage signal Vhr can be set to specify a predetermined sign if it takes zero and the predetermined signed value within a PWM cycle Tc.

Note that a parameter to which the control system refers to for determining the polarity (sign) of the high-frequency command voltage signal Vhr within the first half of a PWM cycle Tc is not limited to the main current vector I (id, iq). Specifically, as a parameter to which the control system refers to for determining the polarity (sign) of the high-frequency command voltage signal Vhr within the first half of a PWM cycle Tc, the command current vector Ir (id, iq) can be used. In addition, as a parameter to which the control system refers to for determining the polarity (sign) of the high-frequency command voltage signal Vhr within the first half of a PWM cycle Tc, information of the phase of the command current vector Ir (id, iq) and the rotational angle θ can be used.

Note that the direction determining element according to the second embodiment can be provided independently of the parallel setting element according to the first embodiment. For example, in the second embodiment, when the command current vector Ir is set to a vector whose command d-axis current component idr is zero required for performing maximum torque control to achieve maximum torque output with minimum armature current, and the direction of the high-frequency command voltage signal Vhr is parallel to the d-axis, it is possible to reverse the polarity of the high-frequency command voltage signal Vhr in the same manner as the second embodiment. In this modification, it is effective in preventing an obtuse angle from being formed between the high-frequency command voltage signal and an error voltage due to dead time. This is because the components of the high-frequency command voltage signal contained in the high frequency voltage signal to be actually superimposed are smaller when an obtuse angle is formed between the high-frequency command voltage signal and an error voltage due to dead time than those when an acute angle is formed therebetween.

As the correction voltage vector, a voltage vector with the magnitude identical to that of a corresponding error voltage and with the direction polarity opposite to that of the error voltage is used, but the present disclosure is not limited thereto. Specifically, when a voltage vector with the magnitude not identical to that of a corresponding error voltage and with the direction opposite to that of the error voltage can be used as a correction voltage. This is because the correction voltage vector with the polarity opposite to that of the error voltage vector can reduce the error voltage vector.

As the correction voltage vector, a voltage vector with the direction non-opposite to the direction of the error voltage vector can be used. Specifically, a correction voltage vector with the direction identical to the direction of the vector of the high-frequency command voltage signal Vhr can be used; the correction voltage vector can reduce the error voltage vector. Note that, in this case, it is preferable to calculate the rotational angle θ based on the high-frequency command voltage signal Vhr corrected based on the correction voltage.

It is possible to calculate a correction voltage vector whose polarity is cyclically changed (reversed) with its norm kept unchanged. In this modification, it is effective in preventing an obtuse angle from being formed between the high-frequency command voltage signal and an error voltage due to dead time. This is because the components of the high-frequency command voltage signal contained in the high frequency voltage signal to be actually superimposed are smaller when an obtuse angle is formed between the high-frequency command voltage signal and an error voltage due to dead time than those when an acute angle is formed therebetween.

The present disclosure is not limited to the configuration to calculate a parameter correlated with the rotational angle θ based on the outer product between the high-frequency command voltage signal Vhr and the measured high-frequency components idh and iqh. For example, as described in U.S. Pat. No. 7,932,692 assigned to the same assignee as that of this application, it is possible to calculate a parameter correlated with the rotational angle θ based on the produce between the norm of the vector of a d-axis high-frequency command voltage and the norm of a q-axis high-frequency command voltage.

As means for manipulating the rotational angle θ to feedback control the parameter correlated with the rotational angle θ to its target value, the means for manipulating the angular velocity ω first is disclosed, but a means for directly manipulating the rotational angle θ can be used.

As a dead-time compensating element, the dead-time compensator 34 performs feedforward control of the respective duty signals Du, Dv, and Dw based on the polarities of the corresponding phase currents iu, iv, and iw, but the present disclosure is not limited thereto. Specifically, the dead-time compensator 34 can be configured to perform feedback control of a measured voltage of the output voltage of the inverter IV for each phase to a command voltage for a corresponding phase. In this modification, if the rising edge and the falling edge of each of the drive signals is shifted by a preset time (dead time), it is possible to prevent an error from being included in the high-frequency voltage signal within periods outside zero-cross periods.

The control system according to the present disclosure can eliminate the dead-time compensating element, which adjusts, to zero, an error in an average line voltage due to dead time as a direct controlled variable. In this modification, the current feedback control illustrated in FIG. 2 can compensate for the deviation of an average line voltage defined based on a PWM signal g* before correction from that defined based on a corrected PWM signal g* due to dead time if no phase currents cross zero level.

In each of the first to eighth embodiments, update timing for each of the command voltages vur, vvr, and vwr is synchronized with a positive peak of the carrier CS, but it can be synchronized with a negative peak of the carrier CS. In this modification, when the polarity determining method described in the second embodiment based on the stationary coordinate system defined on the stator illustrated in FIG. 2 is used, the polarities of the d-axis high-frequency component vdhr illustrated in FIG. 12 should be reversed.

The carrier CS is not limited to a cyclic triangular carrier. Any symmetric carrier, whose amplitude rises in a given velocity in a given period and falls in the same velocity in the same period, can be used. In this modification, it is easy to shift the rising edge and the falling edge of each of the drive signals a preset time (dead time).

A cyclic saw-tooth carrier can be used as the carrier CS. In this case, even if each of phase currents is out of a corresponding zero-cross period, an error due to dead time may arise in the high-frequency voltage signal irrespective of execution of the feedback control of the controlled variable. Thus, even if each of phase currents is out of a corresponding zero-cross period, the dead-time compensating task set forth above can be executed to prevent or reduce the adverse affects of errors due to dead time.

As a rotary machine, a three-phase rotary machine having three-phase armature windings (U-, V-, and W-phase windings) each having one end connected to a common junction (neutral point) and the other end to a separate terminal is used, but the present disclosure is not limited thereto. Specifically, a five-phase rotary machine having five-phase armature windings each having one end connected to a common junction (neutral point) and the other end to a separate terminal can be used. In this modification, the control system 100 can be configured to switch the polarity of the d-axis component vdhr of the high-frequency command voltage signal Vhr every rotational angle θ of (360/5)/n electrical degrees equal to 72/n electrical degrees; n is an integer of any one of 1, 2, 3, . . . .

As a final controlled variable of the motor-generator 10, an actual torque of the motor-generator 10 is used, but the present disclosure is not limited thereto. Specifically, the rotational speed of the motor-generator 10 can be used. The control system according to each of the first to eighth embodiments is configured to perform current vector control, but can be configured to perform torque feed back control in place of or in addition to the current vector control. In the torque feedback control mode, when the control system can be configured to set a command voltage as a manipulated variable for control of a controlled variable, and set a drive signal for each switching element of the inverter IV based on comparison in magnitude between the command value and a symmetric carrier, the control system can be equipped with the dead time compensation function set forth above by feedback control of the controlled variable.

In each of the first to tenth embodiments and their modifications, as the salient-pole rotary machine, an IPMSM is used, but another type of salient-pole rotary machines, such as a Synchronous Reluctance Motor, can be used.

Various types of rotary machines according to the present disclosure can be installed in various types of vehicle, such as an electric automobile. Various types of rotary machines to which the present invention can be applied are not limited to a component of a drive system of vehicles, such as a rotary machine to be installed in a power steering system.

As a DC power source to be connected with the input terminals of the inverter IV, the converter CV is used but the present disclosure is not limited thereto. Specifically, a high voltage battery can be used for the battery 12, and can be directly connected with the input terminals of the inverter IV without provided with the converter CV.

Note that, in the present disclosure, the high-frequency voltage signal setter 50 and the superimposing unit 52 serve as, for example, a superimposing element (module). The high-frequency voltage signal setter 50 and the superimposing units 52 and 53 can also serve as, for example, a superimposing element (a superimposing module). In the present disclosure, the high-pass filter 58, the outer product calculator 60, the velocity calculator 66, and the angle calculator 68 serve as, for example, a calculating element (module). The high-pass filter 58, the outer product calculator 60 (or the product calculator 60a), the velocity calculator 66, the angle calculator 68, the target setter 70, and the deviation calculator 72 can also serve as, for example, a calculating element (module). In the present disclosure, the command current setter 20 serves as, for example, a reducing element.

While illustrative embodiments of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A system for driving an inverter equipped with a first switching element, a first diode connected in antiparallel to the first switching element, a second switching element, and a second diode connected in antiparallel to the second switching element, so that the inverter connects a terminal of a salient-pole rotary machine selectively to one of a positive terminal and a negative terminal of a direct voltage power supply via the respective first and second switching elements to thereby control a controlled variable of the rotary machine, the first and second switching elements being turned on or off with a dead time during which both the first and second switching elements are off, the system comprising:

a superimposing element configured to set a command value vector of a high-frequency voltage signal and superimpose the high-frequency voltage signal with the command value vector on a command voltage for an output voltage of the inverter, the high-frequency voltage signal having a frequency higher than an electrical angular frequency of the rotary machine, the command value vector being correlated with a measured high-frequency component value of a current signal flowing in the rotary machine;

a calculating element configured to calculate a rotational angle of the rotary machine based on the measured high-frequency component value of the current signal flowing in the rotary machine; and a reducing element configured to control at least one of the inverter and the direct voltage power supply to reduce a deviation of each of the command value vector and the vector of the high-frequency voltage signal to be actually superimposed on the command voltage from a parallel direction of the command value vector and the vector of the high-frequency voltage signal, the deviation being due to an error voltage vector, the error voltage vector being based on a difference between the command voltage vector and the vector of the high-frequency voltage signal to be actually superimposed during the dead time that is generated while a terminal current flowing in the terminal of the rotary machine crosses zero level.

2. The system according to claim 1, wherein the reducing element further comprises a parallel setting element configured to set the command value vector such that a direction of the error voltage vector and a direction of the command value vector are parallel to each other.

3. The system according to claim 1, wherein the direct voltage power supply is configured to variably control the output voltage thereof, and the reducing element is configured to reduce the output voltage of the direct voltage power supply when determining that an angle formed by the command voltage vector and the vector of the high-frequency voltage signal to be actually superimposed is estimated to become larger than zero.

4. The system according to claim 1, wherein the direct voltage power supply is configured to variably control the output voltage thereof, and the reducing element is configured to reduce a length of the dead time when determining that an angle formed by the command voltage vector and the vector of the high-frequency voltage signal to be actually superimposed is estimated to become larger than zero.

5. The system according to claim 1, wherein the superimposing element further comprises:

a correction voltage calculator configured to calculate a correction voltage vector that cancels the error voltage vector; and a controller configured to correct the command value vector set by the superimposing element based on the correction voltage vector, and control the inverter based on a result of the correction, and wherein the calculating element is configured to calculate the rotational angle of the rotary machine based on the measured high-frequency component of the current signal and the command value vector set by the superimposing element before correction.

6. The system according to claim 2, further comprising:
a dead time compensator configured to shift a start edge and an end edge of an on duration for each of the first and second switching elements by a preset same time to compensate for an error due to the dead time,
wherein the parallel setting element is configured to set the direction of the command value vector to be orthogonal to a direction of a current parameter correlated with the current signal flowing in the rotary machine.

7. The system according to claim 2, wherein the parallel setting element further comprises a direction determining element configured to determine the direction of the command value vector such that the direction of the command value vector is in agreement with the direction of the high-frequency voltage signal to be actually superimposed.

8. The system according to claim 3, further comprising:
a dead time compensator configured to shift a start edge and an end edge of an on duration for each of the first and second switching elements by a preset same time to compensate for an error due to the dead time,
wherein, when determining that a current flowing through the terminal of the rotary machine crosses zero level, the reducing element determines that the angle formed by the command voltage vector and the vector of the high-frequency voltage signal to be actually superimposed is estimated to become larger than zero.

9. The system according to claim 6, wherein the parallel setting element is configured to switch the direction of the command value vector such that the direction of the command value vector is orthogonal to a direction of the current signal flowing in the rotary machine within a period, the period having a zero-cross period during which the terminal current flowing in the terminal of the rotary machine crosses zero level.

10. The system according to claim 7, further comprising:
a dead time compensator configured to shift a start edge and an end edge of an on duration for each of the first and second switching elements by a preset same time to compensate for an error due to the dead time,
wherein the superimposing element is configured to set the direction of the command value vector for each of a first half and a second half of an updating cycle during which the command voltage for the output voltage of the inverter is updated, the direction of the command value vector for the first half being opposite to the direction of the command value vector for the second half of the updating cycle, the direction determining element being configured to determine the direction of the command value vector for the first half of the updating cycle.

11. The system according to claim 7, wherein the direction determining element is configured to determine the direction of the command value vector based on a direction of the current signal flowing in the rotary machine.

12. The system according to claim 10, wherein the rotary machine is a multiphase rotary machine, and the direction determining element is configured to reverse the direction of the command value vector for the first half of the updating cycle every electrical rotation angle of the rotary machine.

13. The system according to claim 10, wherein the direction determining element is configured to determine the direction of the command value vector for the first half of the updating cycle based on a magnitude of the measured high-frequency component of the current signal.

14. A system for driving an inverter equipped with a first switching element, a first diode connected in antiparallel to the first switching element, a second switching element, and a second diode connected in antiparallel to the second switching element, so that the inverter connects a terminal of a salient rotary machine selectively to one of a positive terminal and a negative terminal of a direct voltage power supply via the respective first and second switching elements to thereby control a controlled variable of the rotary machine, the first and second switching elements being turned on or off with a dead time during which both the first and second switching elements are off, the system comprising:
a superimposing element configured to superimpose a high-frequency voltage signal on an output voltage of the inverter, the high-frequency voltage signal having a frequency higher than an electrical angular frequency of the rotary machine;
a calculating element configured to calculate a rotational angle of the rotary machine based on a measured high-frequency component of a current signal flowing in the rotary machine;
a command value setter configured to set a command value vector of the high-frequency voltage signal;
a correction voltage calculator configured to calculate, based on an error voltage vector, a correction voltage vector that reduces an affect of the error voltage vector on a high-frequency voltage signal to be actually superimposed on the output voltage of the inverter, the error voltage vector being due to a difference between the command voltage vector and a vector of the high-frequency voltage signal to be actually superimposed during the dead time that is generated while a terminal current flowing in the terminal of the rotary machine crosses zero level; and
a controller configured to correct the command value vector based on the correction voltage vector, and control the inverter based on a result of the correction.

15. The system according to claim 14, wherein the correction voltage calculator is configured to calculate the correction voltage vector to cancel the error voltage vector, and the calculator is configured to calculate the rotational angle of the rotary machine based on the measured high-frequency value of the current signal and the command value vector set by the command value setter before correction.

16. The system according to claim 14, further comprising:
a dead time compensator configured to shift a start edge and an end edge of an on duration for each of the first and second switching elements by a preset same time to compensate for an error due to the dead time.

17. A system for driving an inverter equipped with a first switching element, a first diode connected in antiparallel to the first switching element, a second switching element, and a second diode connected in antiparallel to the second switching element, so that the inverter connects a terminal of a salient rotary machine selectively to one of a positive terminal and a negative terminal of a direct voltage power supply via the respective first and second switching elements to thereby control a controlled variable of the rotary machine, the first and second switching elements being turned on or off with a dead time during which both the first and second switching elements are off, the system comprising:
a superimposing element configured to superimpose a high-frequency voltage signal on a command voltage for an output voltage of the inverter, the high-frequency voltage signal having a frequency higher than an electrical angular frequency of the rotary machine; and a calculating element configured to calculate a rotational angle of the rotary machine based on a measured high-frequency value of a current signal flowing in the rotary machine, wherein the superimposing element further comprises:

a command value setter configured to set a command value vector of the high-frequency voltage signal; and a direction determining element configured to determine a reverse timing of a polarity of the command value vector to reduce a high-frequency voltage signal to be actually superimposed on the command voltage for the output voltage of the inverter from being deviated from the command value vector.

* * * * *